US011363179B2

United States Patent
Rivard et al.

(10) Patent No.: US 11,363,179 B2
(45) Date of Patent: Jun. 14, 2022

(54) SYSTEM, METHOD, AND COMPUTER PROGRAM FOR CAPTURING A FLASH IMAGE BASED ON AMBIENT AND FLASH METERING

(71) Applicant: Duelight LLC, Sunnyvale, CA (US)

(72) Inventors: William Guie Rivard, Menlo Park, CA (US); Brian J. Kindle, Sunnyvale, CA (US); Adam Barry Feder, Mountain View, CA (US)

(73) Assignee: DUELIGHT LLC, Sunnyvale, CA (US)

( * ) Notice: Subject to any disclaimer, the term of this patent is extended or adjusted under 35 U.S.C. 154(b) by 0 days.

(21) Appl. No.: 16/663,015

(22) Filed: Oct. 24, 2019

(65) Prior Publication Data

US 2020/0059582 A1 Feb. 20, 2020

Related U.S. Application Data

(63) Continuation of application No. 15/815,463, filed on Nov. 16, 2017, now Pat. No. 10,477,087.

(51) Int. Cl.
*H04N 5/225* (2006.01)
*H04N 5/235* (2006.01)
(Continued)

(52) U.S. Cl.
CPC ......... *H04N 5/2256* (2013.01); *H04N 5/2351* (2013.01); *H04N 5/2353* (2013.01);
(Continued)

(58) Field of Classification Search
CPC .............. H04N 5/2256; H04N 5/2353
See application file for complete search history.

(56) References Cited

U.S. PATENT DOCUMENTS 7,764,880 B2 7/2010 Hamada
8,224,176 B1 7/2012 Pillman et al.
(Continued)

FOREIGN PATENT DOCUMENTS

EP 1549080 A1 6/2005
EP 3105713 A1 12/2016
(Continued)

OTHER PUBLICATIONS

International Preliminary Examination Report from PCT Application No. PCT/US18/61547, dated May 28, 2020.
(Continued)

*Primary Examiner* — Timothy J Henn
(74) *Attorney, Agent, or Firm* — Zilka-Kotab, P.C.

(57) ABSTRACT

A system and method are provided for capturing a flash image based on ambient and flash metering. In use, a first ambient condition is metered for a first ambient frame. Next, a first ambient capture time is determined based on the metering of the first ambient condition. Further, a first flash condition is metered for a first flash frame, and a first flash capture time is determined based on the metering of the first flash condition. Next, a first ambient frame is captured based on the first ambient capture time. After capturing the first ambient frame, a flash circuit is enabled during an active period and, a first flash frame is captured based on a combination of the first ambient capture time and the first flash capture time. Finally, a final image is generated based on the first ambient frame and the first flash frame.

19 Claims, 19 Drawing Sheets

(51) Int. Cl.
*H04N 5/355* (2011.01)
*H04N 5/353* (2011.01)

(52) U.S. Cl.
CPC ......... *H04N 5/2354* (2013.01); *H04N 5/2355* (2013.01); *H04N 5/3532* (2013.01); *H04N 5/35554* (2013.01)

(56) References Cited

U.S. PATENT DOCUMENTS

| | | |
|---|---|---|
| 8,976,264 B2 | 3/2015 | Rivard et al. |
| 9,100,514 B2 | 8/2015 | Gu et al. |
| 9,137,455 B1 | 9/2015 | Rivard et al. |
| 9,154,708 B1 | 10/2015 | Rivard et al. |
| 9,160,936 B1 | 10/2015 | Rivard et al. |
| 9,167,169 B1 | 10/2015 | Rivard et al. |
| 9,179,085 B1 | 11/2015 | Rivard et al. |
| 9,215,433 B2 | 12/2015 | Rivard et al. |
| 9,313,413 B2 | 4/2016 | Cho et al. |
| 9,406,147 B2 | 8/2016 | Rivard et al. |
| 9,560,269 B2 | 1/2017 | Baldwin |
| 9,807,322 B2 | 10/2017 | Feder et al. |
| 9,819,849 B1 | 11/2017 | Rivard et al. |
| 9,860,461 B2 | 1/2018 | Feder et al. |
| 9,918,017 B2 | 3/2018 | Rivard et al. |
| 9,924,147 B2 | 3/2018 | Rivard et al. |
| 10,110,867 B2 | 10/2018 | Rivard et al. |
| 10,182,197 B2 | 1/2019 | Feder et al. |
| 10,284,834 B2 | 5/2019 | Rivard et al. |
| 10,375,367 B2 | 8/2019 | Rivard et al. |
| 10,382,702 B2 | 8/2019 | Rivard et al. |
| 10,469,714 B2 | 11/2019 | Rivard et al. |
| 10,477,077 B2 | 11/2019 | Rivard et al. |
| 10,477,087 B2 * | 11/2019 | Rivard ................. H04N 5/2355 |
| 10,498,982 B2 | 12/2019 | Feder et al. |
| 2007/0201853 A1 | 8/2007 | Petschnigg |
| 2007/0264000 A1 * | 11/2007 | Hsieh ................... H04N 5/2354 396/157 |
| 2009/0040364 A1 | 2/2009 | Rubner |
| 2009/0160944 A1 | 6/2009 | Trevelyan et al. |
| 2010/0278452 A1 | 11/2010 | Sarkijarvi et al. |
| 2016/0248968 A1 | 8/2016 | Baldwin |
| 2017/0048442 A1 | 2/2017 | Cote et al. |
| 2017/0064276 A1 | 3/2017 | Rivard et al. |
| 2019/0124280 A1 | 4/2019 | Feder et al. |
| 2019/0149706 A1 | 5/2019 | Rivard et al. |
| 2019/0342534 A1 | 11/2019 | Rivard et al. |

FOREIGN PATENT DOCUMENTS

| | | |
|---|---|---|
| JP | 2000308068 A | 11/2000 |
| WO | 2016073643 A1 | 5/2016 |
| WO | 2018044314 A1 | 3/2018 |

OTHER PUBLICATIONS

Rivard, W. et al., U.S. Appl. No. 14/887,211, filed Oct. 19, 2015.
Rivard, W. et al., U.S. Appl. No. 14/823,993, filed Aug. 11, 2015.
International Search Report and Written Opinion from PCT Application No. PCT/US18/61547, dated Jan. 25, 2019.
Rivard et al., U.S. Appl. No. 15/815,463, filed Nov. 16, 2017.
Non-Final Office Action from U.S. Appl. No. 15/815,463, dated Mar. 21, 2019.
Notice of Allowance from U.S. Appl. No. 15/815,463, dated Jul. 10, 2019.
Rivard et al., U.S. Appl. No. 16/519,244, filed Jul. 23, 2019.
Rivard et al., U.S. Appl. No. 16/662,965, filed Oct. 24, 2019.
Extended European Search Report from European Application No. 18878357.5, dated May 31, 2021.

* cited by examiner

SYSTEM, METHOD, AND COMPUTER PROGRAM FOR CAPTURING A FLASH IMAGE BASED ON AMBIENT AND FLASH METERING

RELATED APPLICATIONS

The present application is a continuation of and claims priority to U.S. patent application Ser. No. 15/815,463, entitled "SYSTEM, METHOD, AND COMPUTER PROGRAM FOR CAPTURING A FLASH IMAGE BASED ON AMBIENT AND FLASH METERING," filed Nov. 16, 2017, which is hereby incorporated by reference for all purposes.

This application is related to the following U.S. patent applications, the entire disclosures being incorporated by reference herein: application Ser. No. 13/573,252, filed Sep. 4, 2012, issued as U.S. Pat. No. 8,976,264, entitled "COLOR BALANCE IN DIGITAL PHOTOGRAPHY"; application Ser. No. 14/568,045, filed Dec. 11, 2014, issued as U.S. Pat. No. 9,406,147, entitled "COLOR BALANCE IN DIGITAL PHOTOGRAPHY"; application Ser. No. 13/999,343, filed Feb. 11, 2014, issued as U.S. Pat. No. 9,215,433, entitled "SYSTEMS AND METHODS FOR DIGITAL PHOTOGRAPHY"; application Ser. No. 14/887,211, filed Oct. 19, 2015, entitled "SYSTEMS AND METHODS FOR DIGITAL PHOTOGRAPHY"; application Ser. No. 13/999,678, filed Mar. 14, 2014, entitled "SYSTEMS AND METHODS FOR A DIGITAL IMAGE SENSOR"; application Ser. No. 15/354,935, filed Nov. 17, 2016, entitled "SYSTEMS AND METHODS FOR A DIGITAL IMAGE SENSOR"; application Ser. No. 14/534,079, filed Nov. 5, 2014, issued as U.S. Pat. No. 9,137,455, entitled "IMAGE SENSOR APPARATUS AND METHOD FOR OBTAINING MULTIPLE EXPOSURES WITH ZERO INTERFRAME TIME"; application Ser. No 14/823,993, filed Aug. 11, 2015, entitled "IMAGE SENSOR APPARATUS AND METHOD FOR OBTAINING MULTIPLE EXPOSURES WITH ZERO INTERFRAME TIME"; application Ser. No. 14/534,089, filed Nov. 5, 2014, issued as U.S. Pat. No. 9,167,169, entitled "IMAGE SENSOR APPARATUS AND METHOD FOR SIMULTANEOUSLY CAPTURING MULTIPLE IMAGES"; application Ser. No. 14/535,274, filed Nov. 6, 2014, now issued as U.S. Pat. No. 9,154,708, entitled "IMAGE SENSOR APPARATUS AND METHOD FOR SIMULTANEOUSLY CAPTURING FLASH AND AMBIENT ILLUMINATED IMAGES"; application Ser. No. 14/535,279, filed Nov. 6, 2014, now issued as U.S. Pat. No. 9,179,085, entitled "IMAGE SENSOR APPARATUS AND METHOD FOR OBTAINING LOW-NOISE, HIGH-SPEED CAPTURES OF A PHOTOGRAPHIC SCENE"; application Ser. No. 14/536,524, filed Nov. 7, 2014, issued as U.S. Pat. No. 9,160,936, entitled "SYSTEMS AND METHODS FOR GENERATING A HIGH-DYNAMIC RANGE (HDR) PIXEL STREAM"; and application Ser. No. 15/201,283, filed Jul. 1, 2016, entitled "SYSTEMS AND METHODS FOR CAPTURING DIGITAL IMAGES".

FIELD OF THE INVENTION

The present invention relates to capturing an image, and more particularly to capturing a flash image based on ambient and flash metering.

BACKGROUND

Current photographic systems provide for capturing an ambient image and a flash image separately. Flash images are captured in combination with a flash, whereas ambient images are captured based on ambient conditions (e.g. ambient light). However, captured flash images often do not display the correct light and color (as captured, e.g., with an ambient image). Additionally, ambient images may lack correct exposure (e.g. a point of interest may remain dark). As such, elements of a flash image may improve a capture of an ambient image, and elements of an ambient image may improve a capture of a flash image.

There is thus a need for addressing these and/or other issues associated with the prior art.

SUMMARY

A system and method are provided for capturing a flash image based on ambient and flash metering. In use, a first ambient condition is metered for a first ambient frame. Next, a first ambient capture time is determined based on the metering of the first ambient condition. Further, a first flash condition is metered for a first flash frame, and a first flash capture time is determined based on the metering of the first flash condition. Next, a first ambient frame is captured based on the first ambient capture time. After capturing the first ambient frame, a flash circuit is enabled during an active period and, a first flash frame is captured based on a combination of the first ambient capture time and the first flash capture time. Finally, a final image is generated based on the first ambient frame and the first flash frame.

DETAILED DESCRIPTION

Figure 1:
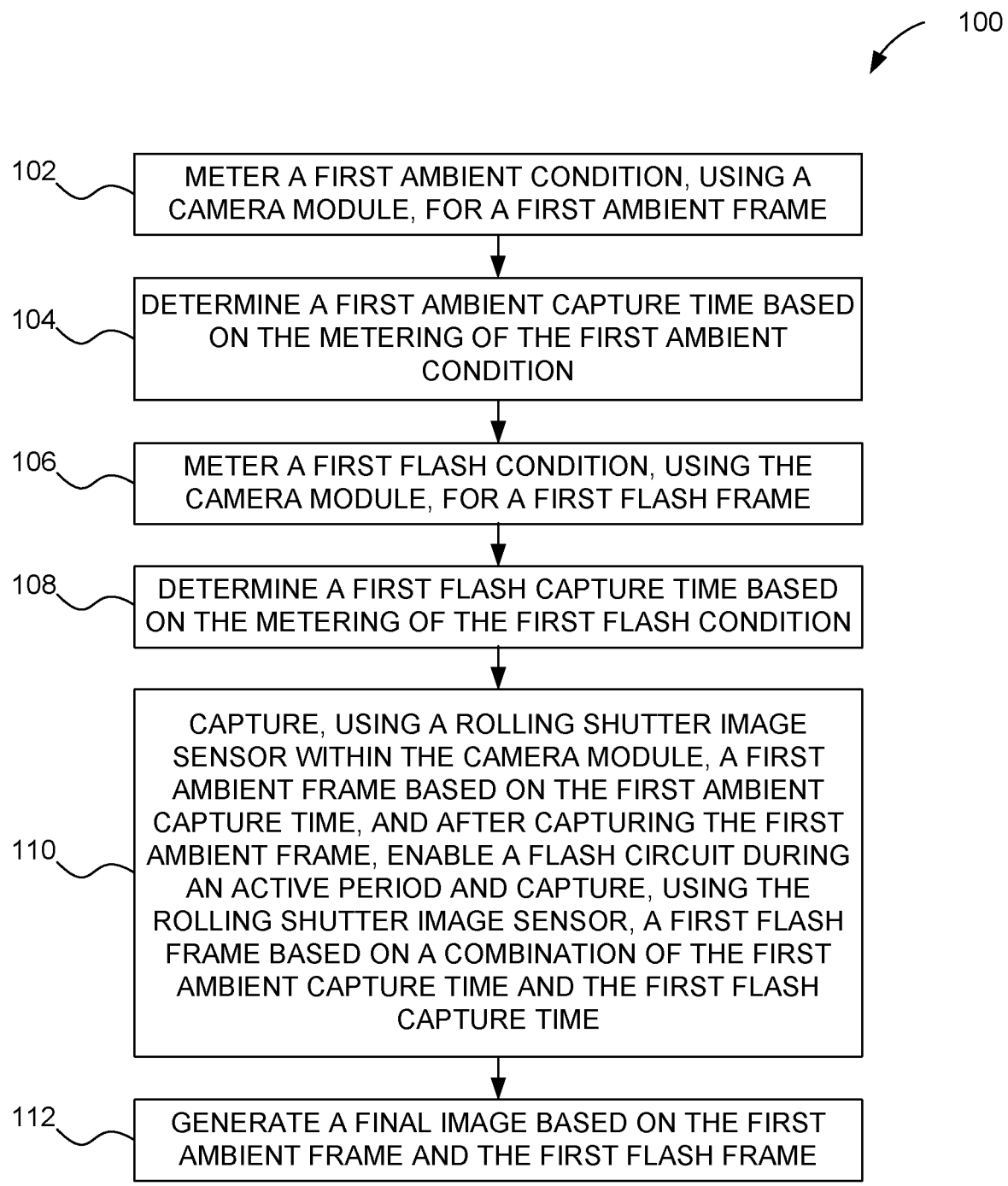
FIG. 1 illustrates an exemplary method for capturing an image based on an ambient capture time and a flash capture time, in accordance with one possible embodiment.

FIG. 1 illustrates an exemplary method 100 for capturing an image based on an ambient capture time and a flash capture time, in accordance with one possible embodiment. As shown, a first ambient condition is metered, using a camera module, for a first ambient frame. See operation 102. In the context of the present description, a first ambient condition includes any non-flash condition and/or environment.

Additionally, in the context of the present description, a camera module includes any camera component which may be used, at least in part, to take a photo and/or video. For example, an image sensor may be integrated with control electronics and/or circuitry to enable the capture of an image, any of and all of which may be construed as some aspect of the camera module.

Still yet, in the context of the present description, metering (e.g. with respect to a first ambient condition or a first flash condition) includes determining the amount of brightness of an image or a part of an image. In some embodiments, metering may include determining a shutter speed, an aperture, an ISO speed, a white balance (e.g. color), etc. In another embodiment, metering may occur based on the camera or by at least one second device, including but not limited to, a second camera, a light meter, a smart phone, etc. Of course, in certain embodiments, the camera module may determine exposure parameters for the photographic scene, such as in response to metering a scene.

As shown, a first ambient capture time is determined based on the metering of the first ambient condition. See operation 104. In one embodiment, the first ambient capture time may be correlated with or constrained to a shutter speed, an exposure, an aperture, a film speed (sensor sensitivity), etc. For example, based on the metering of the first ambient condition, it may be determined that a film speed of ISO 100 with an aperture of f/11 with a time exposure of 1/200 seconds is ideal for the ambient conditions.

Additionally, a first flash condition is metered, using the camera module (one of different camera modules configured to operate in conjunction with the camera module), for a first flash frame. See operation 106. In one embodiment, more than one metering may occur. For example, a first metering (e.g. as shown in operation 102) may be accomplished for an ambient image, and a second metering (e.g. as shown in operation 106) may be accomplished for a flash image. In one embodiment the first metering may include multiple different metering samples using different exposure parameters leading to the ambient metering. Furthermore, the second metering may include multiple different metering samples at different flash intensity levels leading to the flash metering. Of course, however, other metering may occur, including, but not limited to, a pre-metering operation (e.g. pre-flash or flash metering, through-the-lens ("TTL") metering, automatic-TTL metering, etc.), a repetitive metering operation (e.g. multiple flash metering, etc.), etc. In one embodiment, metering may be dependent on the focus point, an amount of time (e.g. between a pre-flash metering and the capture of the image), a number of focus points, etc.

Next, a first flash capture time is determined based on the metering of the first flash condition. See operation 108. In one embodiment, the first flash capture time may be correlated with a shutter speed, an exposure, an aperture, a film speed, etc. For example, based on the metering of the first ambient condition, it may be determined that a film speed of ISO 800 with an aperture of f/1.8 with a time exposure of 1/60 seconds is ideal for the flash conditions. Further, in one embodiment, sampling parameters such as exposure parameter and flash or strobe parameters (e.g. which may contain strobe intensity and strobe color, etc.) may be determined as part of or constrained by the first ambient capture time or the first flash capture time.

In one embodiment, a distance between the camera or the flash, and the focus subject may be included as part of determining the first flash capture time and/or other exposure parameter, such as flash intensity. For example, a distance to a focus subject may influence parameters including aperture, exposure, flash duration, etc. such that the parameters may inherently include a distance from the camera or the flash to the focus subject. For example, a focus subject farther away may have a corresponding greater intensity (or duration) flash to account for such distance. In another embodiment, the distance to a focus subject may be calculated and determined, and such a distance may be retained (and potentially manipulated) to control exposure and/or camera parameters. For example, in one embodiment, a subject focus point may change position. In such an embodiment, the distance may be updated (e.g. via a pre-flash sample, via a manual input of distance, via object tracking and/or focus updates, etc.) and as a result of such an update, camera parameters (e.g. aperture, exposure, flash duration, etc.) may be updated accordingly.

Additionally, using a rolling shutter image sensor within the camera module, a first ambient frame is captured based on the first ambient capture time, and after capturing the first ambient frame, a flash circuit is enabled during an active period and using the rolling shutter image sensor, a first flash frame is captured based on a combination of the first ambient capture time and the first flash capture time. See operation 110. Further, a final image is generated based on the first ambient frame and the first flash frame. See operation 112. In one embodiment, a first line reset may commence the first ambient capture time, and after a certain point, flash may be enabled for the first flash capture time, after which, a first line scan-out may occur to capture the resulting image. After the first line scan-out, then the line may be reset for additional potential captures. In such an embodiment, metering information from the first ambient capture time may be directly used during the first flash capture time to improve color accuracy in the resulting captured image.

Of course, it can be appreciated that although the foregoing embodiment describes using a rolling shutter image sensor, similar methods and techniques may be applied also using a global shutter image sensor.

In one embodiment, at the conclusion of the first ambient capture time, a first line scan-out may occur to capture a resulting ambient image, and at the conclusion of the first flash capture time, a second line scan-out may occur to capture a resulting flash image. However, in such an embodiment, the first line reset would still not occur until the first ambient capture time and the second line scan-out have occurred (in aggregation). A given line scan-out can include a method or process of scanning out a set of lines comprising an image frame. The lines can be scanned out one or more at a time, with analog values of a given line being quantized by one or more analog-to-digital converters to generate a scanned out digital image.

In another embodiment, a first flash capture time may precede a first ambient capture time. In such an embodiment, a first line scan-out may occur at the conclusion of a first flash capture time, and a second line scan-out may occur at the conclusion of the first ambient capture.

In one embodiment, metering a first ambient condition may include identifying a white balance, and metering a first flash condition may include identifying multiple points of interest. In another embodiment, metering the first flash condition may include a pre-metering capture. Additionally, metering the first ambient condition may result in a first set of exposure parameters and the metering the first flash condition may result in a second set of exposure parameters.

Still yet, in one embodiment, an exposure time of the first flash condition may be less than an exposure time of the first ambient condition. Additionally, in one embodiment, metering the first flash condition may include determining one or more of a flash duration, a flash intensity, a flash color, an exposure time, and an ISO value. In one embodiment, two different ISO values are applied to sequentially scanned out frames; that is, a first ISO value is used to scan out a first frame (e.g. the ambient image) using a first analog gain for analog-to-digital conversion of the first frame, and a second ISO value is used to scan out the second frame (e.g., the flash image) using a second analog gain for the analog-to-digital conversion of the second frame.

In one embodiment, a second image may be captured based on the first ambient capture time, a third image may be captured based on the first flash capture time, and the second image and the third image may be blended to create a fourth image.

Additionally, in one embodiment, metering the first flash condition may include determining exposure parameters that satisfy an exposure goal. An exemplary exposure goal ensures that not more than a specified threshold (e.g. 5%) of over-exposed pixels is contained within the first image. Further, the exposure goal may provide a limit on the number of over-exposed pixels within the first image. Still yet, the exposure goal may include a set intensity goal including a range of goal values or a fixed goal value. For example, in one embodiment, a goal value may include a ceiling of maximum percentage of overexposed pixels allowed within a given frame (e.g. a scene, a point of interest, etc.). One exemplary exposure goal for the ambient image may be for the mid-range intensity value for the image (e.g. 0.5 in a 0.0 to 1.0 range) to also be the median pixel intensity value for the image (e.g., "proper" exposure). One exemplary exposure goal for the flash image may be for a number of additional over-exposed pixels relative to the ambient image to not exceed a specified threshold (e.g., not add more than 5% over exposed pixels). This exemplary exposure goal may attempt to reduce overall reflective and/or specular flash back for the flash image.

Moreover, in various embodiments, the exposure goal may bound the portion of over-exposed pixels associated with the metering of the first flash condition to the portion of over-exposed pixels associated with the metering of the first ambient condition. Further, the exposure goal may be associated with a point of interest.

In one embodiment, the first flash condition may determine a flash intensity, where the flash intensity may be used to control over-exposed pixels or may be used to satisfy an exposure goal. Additionally, the flash intensity may be based on the metering of the first ambient condition and a distance to a flash point of interest.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
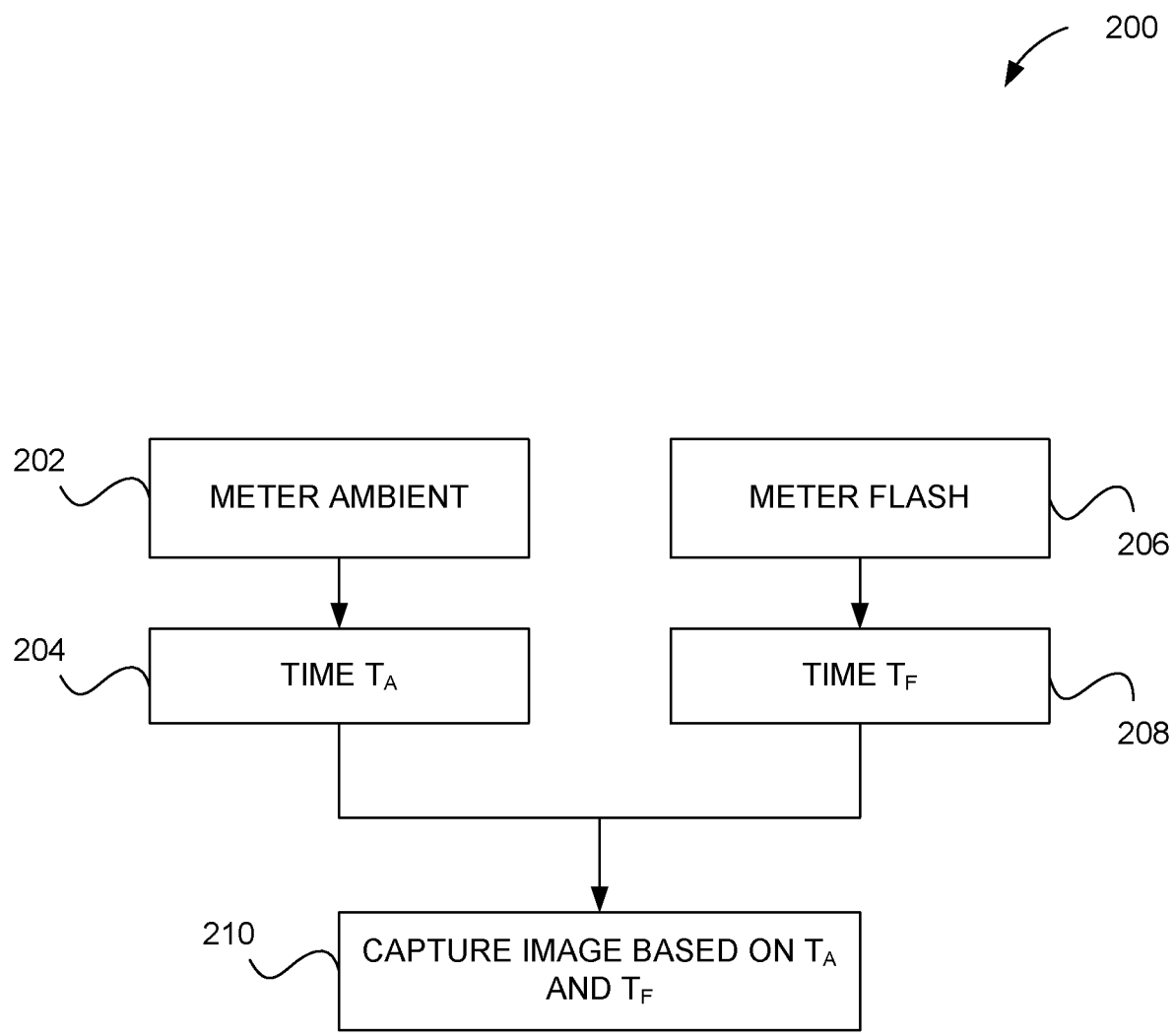
FIG. 2 illustrates a method for capturing an image based on an ambient capture time and a flash capture time, in accordance with one embodiment.

FIG. 2 illustrates a method 200 for capturing an image based on an ambient capture time and a flash capture time, in accordance with one embodiment. As an option, the method 200 may be implemented in the context of any one or more of the embodiments set forth in any previous and/or subsequent figure(s) and/or description thereof. Of course, however, the method 200 may be implemented in the context of any desired environment. In particular, method 200 may be implemented in the context of at least operation 110 of method 100. Further, the aforementioned definitions may equally apply to the description below.

As shown, a meter ambient 202 leads to ambient time (ambient capture time) $T_A$ 204, and meter flash 206 leads to flash time (flash capture time) $T_F$ 208, after which the combination of ambient time $T_A$ 204 and flash time $T_F$ 208 lead to operation 210 where an image is captured based on $T_A$ 204 and $T_F$ 208.

In one embodiment, ambient time $T_A$ 204 and flash time $T_F$ 208 may include a specific time (e.g. associated with an ambient condition or a flash condition respectively). In other embodiments, ambient time $T_A$ 204 and flash time $T_F$ 208 may each include information other than time, including, but not limited to, subject focus information (e.g. pixel coordinate for object, etc.), color information (e.g. white-balance, film color, etc.), device information (e.g. metering device information, camera metadata, etc.), parameters (e.g. aperture, film speed, etc.), and/or any other data which may be associated in some manner with a result of meter ambient 202 and/or meter flash 206. In this manner, therefore, the captured image (e.g. as indicated in operation 210) may incorporate overlap of information and time for ambient and flash conditions.

Figure 3A:
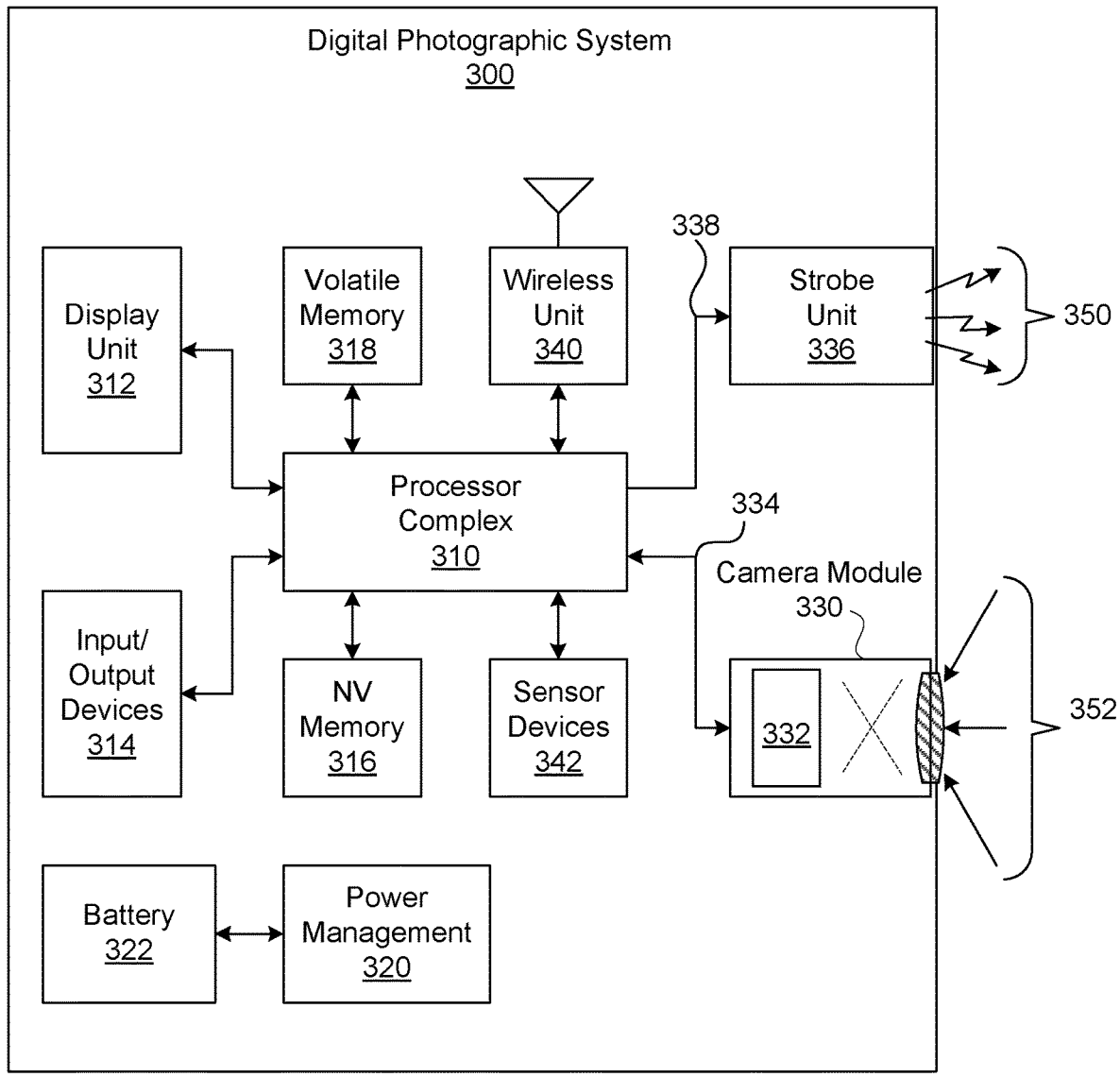
FIG. 3A illustrates a digital photographic system, in accordance with an embodiment.

FIG. 3A illustrates a digital photographic system 300, in accordance with one embodiment. As an option, the digital photographic system 300 may be implemented in the context of the details of any of the Figures disclosed herein. Of course, however, the digital photographic system 300 may be implemented in any desired environment. Further, the aforementioned definitions may equally apply to the description below.

As shown, the digital photographic system 300 may include a processor complex 310 coupled to a camera module 330 via an interconnect 334. In one embodiment, the processor complex 310 is coupled to a strobe unit 336. The digital photographic system 300 may also include, without limitation, a display unit 312, a set of input/output devices 314, non-volatile memory 316, volatile memory 318, a wireless unit 340, and sensor devices 342, each coupled to the processor complex 310. In one embodiment, a power management subsystem 320 is configured to generate appropriate power supply voltages for each electrical load element within the digital photographic system 300. A battery 322 may be configured to supply electrical energy to the power management subsystem 320. The battery 322 may implement any technically feasible energy storage system, including primary or rechargeable battery technologies. Of course, in other embodiments, additional or fewer features, units, devices, sensors, or subsystems may be included in the system.

In one embodiment, a strobe unit 336 may be integrated into the digital photographic system 300 and configured to provide strobe illumination 350 during an image sample event performed by the digital photographic system 300. In another embodiment, a strobe unit 336 may be implemented as an independent device from the digital photographic system 300 and configured to provide strobe illumination 350 during an image sample event performed by the digital photographic system 300. The strobe unit 336 may comprise one or more LED devices, a gas-discharge illuminator (e.g. a Xenon strobe device, a Xenon flash lamp, etc.), or any other technically feasible illumination device. In certain embodiments, two or more strobe units are configured to synchronously generate strobe illumination in conjunction with sampling an image. In one embodiment, the strobe unit 336 is controlled through a strobe control signal 338 to either emit the strobe illumination 350 or not emit the strobe illumination 350. The strobe control signal 338 may be implemented using any technically feasible signal transmission protocol. The strobe control signal 338 may indicate a strobe parameter (e.g. strobe intensity, strobe color, strobe time, etc.), for directing the strobe unit 336 to generate a specified intensity and/or color of the strobe illumination 350. The strobe control signal 338 may be generated by the processor complex 310, the camera module 330, or by any other technically feasible combination thereof. In one embodiment, the strobe control signal 338 is generated by a camera interface unit within the processor complex 310 and transmitted to both the strobe unit 336 and the camera module 330 via the interconnect 334. In another embodiment, the strobe control signal 338 is generated by the camera module 330 and transmitted to the strobe unit 336 via the interconnect 334.

Optical scene information 352, which may include at least a portion of the strobe illumination 350 reflected from objects in the photographic scene, is focused as an optical image onto an image sensor 332 within the camera module 330. The image sensor 332 generates an electronic representation of the optical image. The electronic representation comprises spatial color intensity information, which may include different color intensity samples (e.g. red, green, and blue light, etc.). In other embodiments, the spatial color intensity information may also include samples for white light. The electronic representation is transmitted to the processor complex 310 via the interconnect 334, which may implement any technically feasible signal transmission protocol.

In one embodiment, input/output devices 314 may include, without limitation, a capacitive touch input surface, a resistive tablet input surface, one or more buttons, one or more knobs, light-emitting devices, light detecting devices, sound emitting devices, sound detecting devices, or any other technically feasible device for receiving user input and converting the input to electrical signals, or converting electrical signals into a physical signal. In one embodiment, the input/output devices 314 include a capacitive touch input surface coupled to a display unit 312. A touch entry display system may include the display unit 312 and a capacitive touch input surface, also coupled to processor complex 310.

Additionally, in other embodiments, non-volatile (NV) memory 316 is configured to store data when power is interrupted. In one embodiment, the NV memory 316 comprises one or more flash memory devices (e.g. ROM, PCM, FeRAM, FRAM, PRAM, MRAM, NRAM, etc.). The NV memory 316 comprises a non-transitory computer-readable medium, which may be configured to include programming instructions for execution by one or more processing units within the processor complex 310. The programming instructions may implement, without limitation, an operating system (OS), UI software modules, image processing and storage software modules, one or more input/output devices 314 connected to the processor complex 310, one or more software modules for sampling an image stack through camera module 330, one or more software modules for presenting the image stack or one or more synthetic images generated from the image stack through the display unit 312. As an example, in one embodiment, the programming instructions may also implement one or more software modules for merging images or portions of images within the image stack, aligning at least portions of each image within the image stack, or a combination thereof. In another embodiment, the processor complex 310 may be configured to execute the programming instructions, which may implement one or more software modules operable to create a high dynamic range (HDR) image.

Still yet, in one embodiment, one or more memory devices comprising the NV memory 316 may be packaged as a module configured to be installed or removed by a user. In one embodiment, volatile memory 318 comprises dynamic random access memory (DRAM) configured to temporarily store programming instructions, image data such as data associated with an image stack, and the like, accessed during the course of normal operation of the digital photographic system 300. Of course, the volatile memory may be used in any manner and in association with any other input/output device 314 or sensor device 342 attached to the process complex 310.

In one embodiment, sensor devices 342 may include, without limitation, one or more of an accelerometer to detect motion and/or orientation, an electronic gyroscope to detect motion and/or orientation, a magnetic flux detector to detect orientation, a global positioning system (GPS) module to detect geographic position, or any combination thereof. Of course, other sensors, including but not limited to a motion detection sensor, a proximity sensor, an RGB light sensor, a gesture sensor, a 3-D input image sensor, a pressure sensor, and an indoor position sensor, may be integrated as sensor devices. In one embodiment, the sensor devices may be one example of input/output devices 314.

Wireless unit 340 may include one or more digital radios configured to send and receive digital data. In particular, the wireless unit 340 may implement wireless standards (e.g. WiFi, Bluetooth, NFC, etc.), and may implement digital cellular telephony standards for data communication (e.g. CDMA, 3G, 4G, LTE, LTE-Advanced, etc.). Of course, any wireless standard or digital cellular telephony standards may be used.

In one embodiment, the digital photographic system 300 is configured to transmit one or more digital photographs to a network-based (online) or "cloud-based" photographic media service via the wireless unit 340. The one or more digital photographs may reside within either the NV memory 316 or the volatile memory 318, or any other memory device associated with the processor complex 310. In one embodiment, a user may possess credentials to access an online photographic media service and to transmit one or more digital photographs for storage to, retrieval from, and presentation by the online photographic media service. The credentials may be stored or generated within the digital photographic system 300 prior to transmission of the digital photographs. The online photographic media service may comprise a social networking service, photograph sharing service, or any other network-based service that provides storage of digital photographs, processing of digital photographs, transmission of digital photographs, sharing of digital photographs, or any combination thereof. In certain embodiments, one or more digital photographs are generated by the online photographic media service based on image data (e.g. image stack, HDR image stack, image package, etc.) transmitted to servers associated with the online photographic media service. In such embodiments, a user may upload one or more source images from the digital photographic system 300 for processing by the online photographic media service.

In one embodiment, the digital photographic system 300 comprises at least one instance of a camera module 330. In another embodiment, the digital photographic system 300 comprises a plurality of camera modules 330. Such an embodiment may also include at least one strobe unit 336 configured to illuminate a photographic scene, sampled as multiple views by the plurality of camera modules 330. The plurality of camera modules 330 may be configured to sample a wide angle view (e.g., greater than forty-five degrees of sweep among cameras) to generate a panoramic photograph. In one embodiment, a plurality of camera modules 330 may be configured to sample two or more narrow angle views (e.g., less than forty-five degrees of sweep among cameras) to generate a stereoscopic photograph. In other embodiments, a plurality of camera modules 330 may be configured to generate a 3-D image or to otherwise display a depth perspective (e.g. a z-component, etc.) as shown on the display unit 312 or any other display device.

In one embodiment, a display unit 312 may be configured to display a two-dimensional array of pixels to form an image for display. The display unit 312 may comprise a liquid-crystal (LCD) display, a light-emitting diode (LED) display, an organic LED display, or any other technically feasible type of display. In certain embodiments, the display unit 312 may be able to display a narrower dynamic range of image intensity values than a complete range of intensity values sampled from a photographic scene, such as within a single HDR image or over a set of two or more images comprising a multiple exposure or HDR image stack. In one embodiment, images comprising an image stack may be merged according to any technically feasible HDR blending technique to generate a synthetic image for display within dynamic range constraints of the display unit 312. In one embodiment, the limited dynamic range may specify an eight-bit per color channel binary representation of corresponding color intensities. In other embodiments, the limited dynamic range may specify more than eight-bits (e.g., 10 bits, 12 bits, or 14 bits, etc.) per color channel binary representation.

Figure 3B:
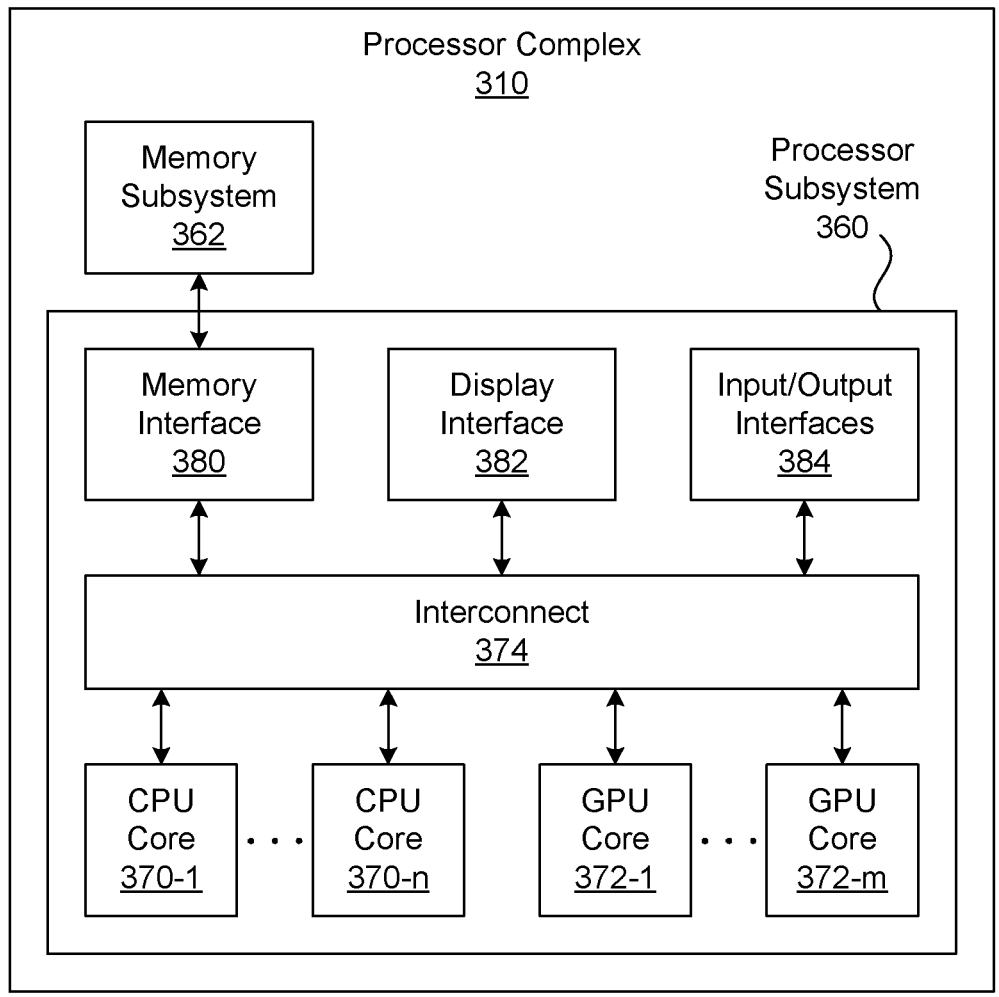
FIG. 3B illustrates a processor complex within the digital photographic system, according to one embodiment.

FIG. 3B illustrates a processor complex 310 within the digital photographic system 300 of FIG. 3A, in accordance with one embodiment. As an option, the processor complex 310 may be implemented in the context of the details of any of the Figures disclosed herein. Of course, however, the processor complex 310 may be implemented in any desired environment. Further, the aforementioned definitions may equally apply to the description below.

As shown, the processor complex 310 includes a processor subsystem 360 and may include a memory subsystem 362. In one embodiment, processor complex 310 may comprise a system on a chip (SoC) device that implements processor subsystem 360, and memory subsystem 362 comprises one or more DRAM devices coupled to the processor subsystem 360. In another embodiment, the processor complex 310 may comprise a multi-chip module (MCM) encapsulating the SoC device and the one or more DRAM devices comprising the memory subsystem 362.

The processor subsystem 360 may include, without limitation, one or more central processing unit (CPU) cores 370, a memory interface 380, input/output interfaces unit 384, and a display interface unit 382, each coupled to an interconnect 374. The one or more CPU cores 370 may be configured to execute instructions residing within the memory subsystem 362, volatile memory 318, NV memory 316, or any combination thereof. Each of the one or more CPU cores 370 may be configured to retrieve and store data through interconnect 374 and the memory interface 380. In one embodiment, each of the one or more CPU cores 370 may include a data cache, and an instruction cache. Additionally, two or more of the CPU cores 370 may share a data cache, an instruction cache, or any combination thereof. In one embodiment, a cache hierarchy is implemented to provide each CPU core 370 with a private cache layer, and a shared cache layer.

In some embodiments, processor subsystem 360 may include one or more graphics processing unit (GPU) cores 372. Each GPU core 372 may comprise a plurality of multi-threaded execution units that may be programmed to implement, without limitation, graphics acceleration functions. In various embodiments, the GPU cores 372 may be configured to execute multiple thread programs according to well-known standards (e.g. OpenGL™, WebGL™, OpenCL™, CUDA™, etc.), and/or any other programmable rendering graphic standard. In certain embodiments, at least one GPU core 372 implements at least a portion of a motion estimation function, such as a well-known Harris detector or a well-known Hessian-Laplace detector. Such a motion estimation function may be used at least in part to align images or portions of images within an image stack. For example, in one embodiment, an HDR image may be compiled based on an image stack, where two or more images are first aligned prior to compiling the HDR image.

As shown, the interconnect 374 is configured to transmit data between and among the memory interface 380, the display interface unit 382, the input/output interfaces unit 384, the CPU cores 370, and the GPU cores 372. In various embodiments, the interconnect 374 may implement one or more buses, one or more rings, a cross-bar, a mesh, or any other technically feasible data transmission structure or technique. The memory interface 380 is configured to couple the memory subsystem 362 to the interconnect 374. The memory interface 380 may also couple NV memory 316, volatile memory 318, or any combination thereof to the interconnect 374. The display interface unit 382 may be configured to couple a display unit 312 to the interconnect 374. The display interface unit 382 may implement certain frame buffer functions (e.g. frame refresh, etc.). Alternatively, in another embodiment, the display unit 312 may implement certain frame buffer functions (e.g. frame refresh, etc.). The input/output interfaces unit 384 may be configured to couple various input/output devices to the interconnect 374.

In certain embodiments, a camera module 330 is configured to store exposure parameters for sampling each image associated with an image stack. For example, in one embodiment, when directed to sample a photographic scene, the camera module 330 may sample a set of images comprising the image stack according to stored exposure parameters. A software module comprising programming instructions executing within a processor complex 310 may generate and store the exposure parameters prior to directing the camera module 330 to sample the image stack. In other embodiments, the camera module 330 may be used to meter an image or an image stack, and the software module comprising programming instructions executing within a processor complex 310 may generate and store metering parameters prior to directing the camera module 330 to capture the image. Of course, the camera module 330 may be used in any manner in combination with the processor complex 310.

In one embodiment, exposure parameters associated with images comprising the image stack may be stored within an exposure parameter data structure that includes exposure parameters for one or more images. In another embodiment, a camera interface unit (not shown in FIG. 3B) within the processor complex 310 may be configured to read exposure parameters from the exposure parameter data structure and to transmit associated exposure parameters to the camera module 330 in preparation of sampling a photographic scene. After the camera module 330 is configured according to the exposure parameters, the camera interface may direct the camera module 330 to sample the photographic scene; the camera module 330 may then generate a corresponding image stack. The exposure parameter data structure may be stored within the camera interface unit, a memory circuit within the processor complex 310, volatile memory 318, NV memory 316, the camera module 330, or within any other technically feasible memory circuit. Further, in another embodiment, a software module executing within processor complex 310 may generate and store the exposure parameter data structure.

Figure 3C:
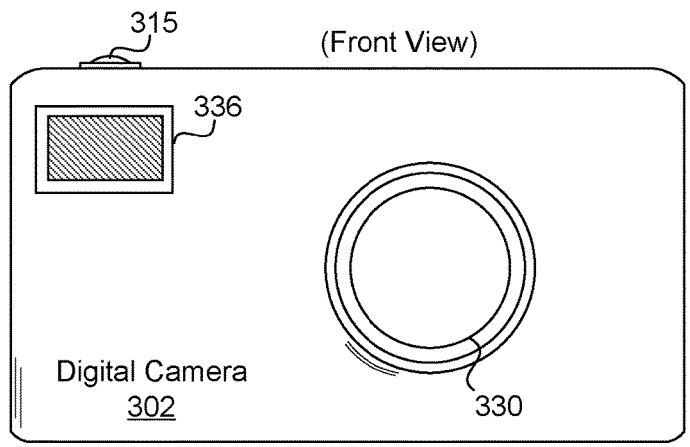
FIG. 3C illustrates a digital camera, in accordance with an embodiment.

FIG. 3C illustrates a digital camera 302, in accordance with one embodiment. As an option, the digital camera 302 may be implemented in the context of the details of any of the Figures disclosed herein. Of course, however, the digital camera 302 may be implemented in any desired environment. Further, the aforementioned definitions may equally apply to the description below.

In one embodiment, the digital camera 302 may be configured to include a digital photographic system, such as digital photographic system 300 of FIG. 3A. As shown, the digital camera 302 includes a camera module 330, which may include optical elements configured to focus optical scene information representing a photographic scene onto an image sensor, which may be configured to convert the optical scene information to an electronic representation of the photographic scene.

Additionally, the digital camera 302 may include a strobe unit 336, and may include a shutter release button 315 for triggering a photographic sample event, whereby digital camera 302 samples one or more images comprising the electronic representation. In other embodiments, any other technically feasible shutter release mechanism may trigger the photographic sample event (e.g. such as a timer trigger or remote control trigger, etc.).

Figure 3D:
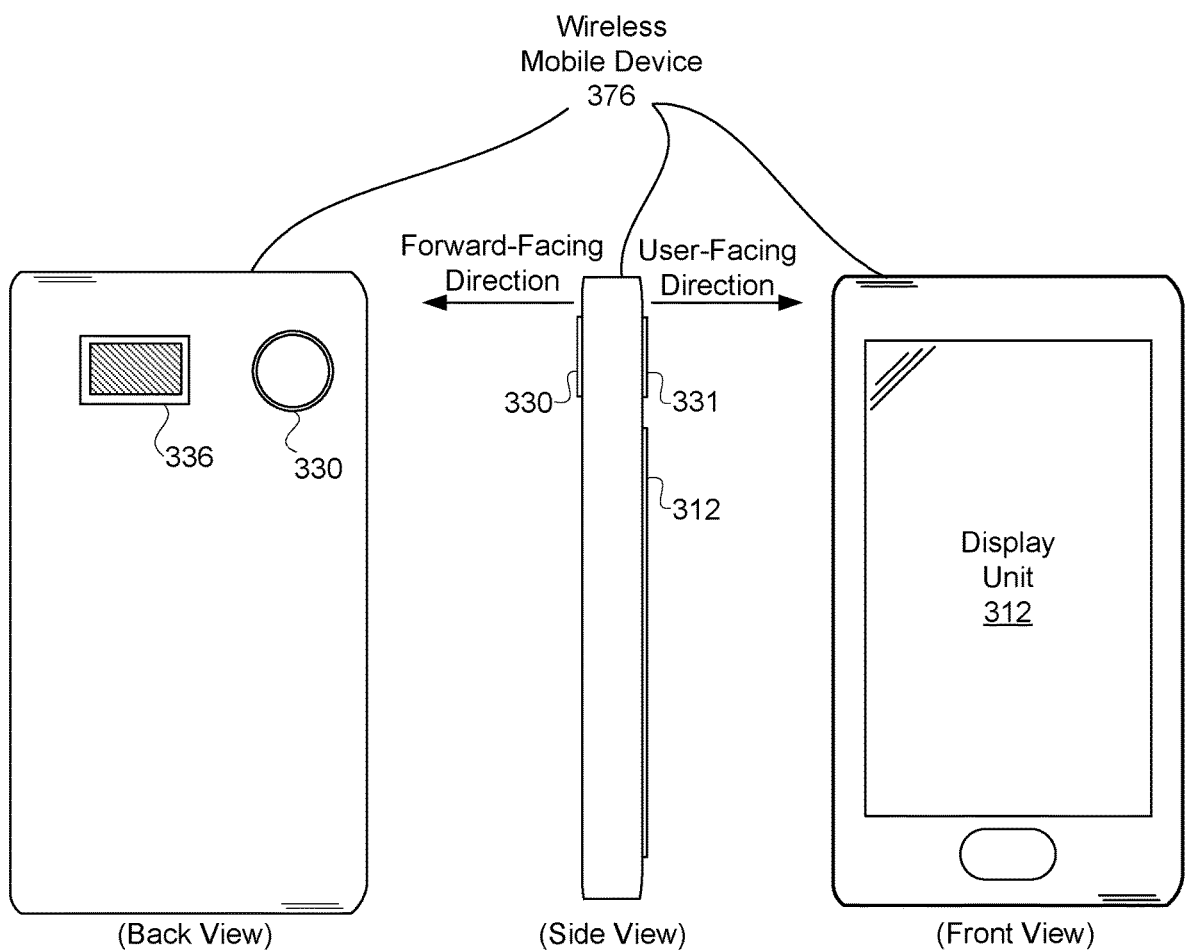
FIG. 3D illustrates a wireless mobile device, in accordance with another embodiment.

FIG. 3D illustrates a wireless mobile device 376, in accordance with one embodiment. As an option, the mobile device 376 may be implemented in the context of the details of any of the Figures disclosed herein. Of course, however, the mobile device 376 may be implemented in any desired environment. Further, the aforementioned definitions may equally apply to the description below.

In one embodiment, the mobile device 376 may be configured to include a digital photographic system (e.g. such as digital photographic system 300 of FIG. 3A), which is configured to sample a photographic scene. In various embodiments, a camera module 330 may include optical elements configured to focus optical scene information representing the photographic scene onto an image sensor, which may be configured to convert the optical scene information to an electronic representation of the photographic scene. Further, a shutter release command may be generated through any technically feasible mechanism, such as a virtual button, which may be activated by a touch gesture on a touch entry display system comprising display unit 312, or a physical button, which may be located on any face or surface of the mobile device 376. Of course, in other embodiments, any number of other buttons, external inputs/outputs, or digital inputs/outputs may be included on the mobile device 376, and which may be used in conjunction with the camera module 330.

As shown, in one embodiment, a touch entry display system comprising display unit 312 is disposed on the opposite side of mobile device 376 from camera module 330. In certain embodiments, the mobile device 376 includes a user-facing camera module 331 and may include a user-facing strobe unit (not shown). Of course, in other embodiments, the mobile device 376 may include any number of user-facing camera modules or rear-facing camera modules, as well as any number of user-facing strobe units or rear-facing strobe units.

In some embodiments, the digital camera 302 and the mobile device 376 may each generate and store a synthetic image based on an image stack sampled by camera module 330. The image stack may include one or more images sampled under ambient lighting conditions, one or more images sampled under strobe illumination from strobe unit 336, or a combination thereof.

Figure 3E:
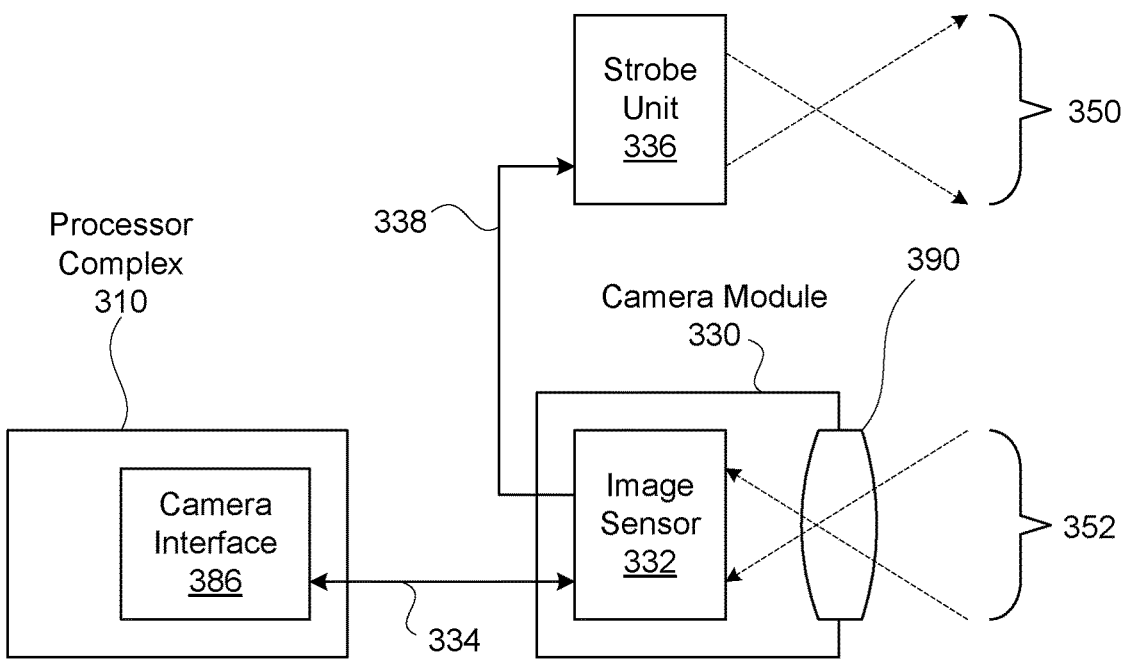
FIG. 3E illustrates a camera module configured to sample an image, according to one embodiment.

FIG. 3E illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to control strobe unit 336 through strobe control signal 338. As shown, a lens 390 is configured to focus optical scene information 352 onto image sensor 332 to be sampled. In one embodiment, image sensor 332 advantageously controls detailed timing of the strobe unit 336 though the strobe control signal 338 to reduce inter-sample time between an image sampled with the strobe unit 336 enabled, and an image sampled with the strobe unit 336 disabled. For example, the image sensor 332 may enable the strobe unit 336 to emit strobe illumination 350 less than one microsecond (or any desired length) after image sensor 332 completes an exposure time associated with sampling an ambient image and prior to sampling a strobe image.

In other embodiments, the strobe illumination 350 may be configured based on a desired one or more target points. For example, in one embodiment, the strobe illumination 350 may light up an object in the foreground, and depending on the length of exposure time, may also light up an object in the background of the image. In one embodiment, once the strobe unit 336 is enabled, the image sensor 332 may then immediately begin exposing a strobe image. The image sensor 332 may thus be able to directly control sampling operations, including enabling and disabling the strobe unit 336 associated with generating an image stack, which may comprise at least one image sampled with the strobe unit 336 disabled, and at least one image sampled with the strobe unit 336 either enabled or disabled. In one embodiment, data comprising the image stack sampled by the image sensor 332 is transmitted via interconnect 334 to a camera interface unit 386 within processor complex 310. In some embodiments, the camera module 330 may include an image sensor controller (e.g., controller 333 of FIG. 3G), which may be configured to generate the strobe control signal 338 in conjunction with controlling operation of the image sensor 332.

Figure 3F:
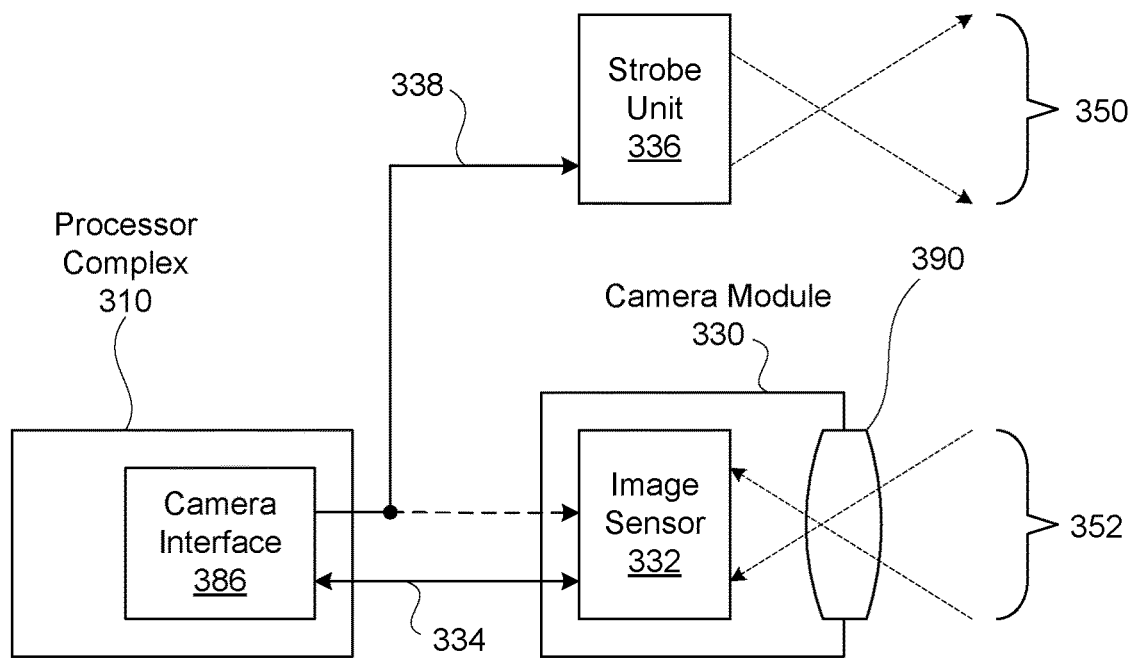
FIG. 3F illustrates a camera module configured to sample an image, according to another embodiment.

FIG. 3F illustrates a camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to sample an image based on state information for strobe unit 336. The state information may include, without limitation, one or more strobe parameters (e.g. strobe intensity, strobe color, strobe time, etc.), for directing the strobe unit 336 to generate a specified intensity and/or color of the strobe illumination 350. In one embodiment, commands for configuring the state information associated with the strobe unit 336 may be transmitted through a strobe control signal 338, which may be monitored by the camera module 330 to detect when the strobe unit 336 is enabled. For example, in one embodiment, the camera module 330 may detect when the strobe unit 336 is enabled or disabled within a microsecond or less of the strobe unit 336 being enabled or disabled by the strobe control signal 338. To sample an image requiring strobe illumination, a camera interface unit 386 may enable the strobe unit 336 by sending an enable command through the strobe control signal 338. In one embodiment, the camera interface unit 386 may be included as an interface of input/output interfaces 384 in a processor subsystem 360 of the processor complex 310 of FIG. 3B. The enable command may comprise a signal level transition, a data packet, a register write, or any other technically feasible transmission of a command. The camera module 330 may sense that the strobe unit 336 is enabled and then cause image sensor 332 to sample one or more images requiring strobe illumination while the strobe unit 336 is enabled. In such an implementation, the image sensor 332 may be configured to wait for an enable signal destined for the strobe unit 336 as a trigger signal to begin sampling a new exposure.

In one embodiment, camera interface unit 386 may transmit exposure parameters and commands to camera module 330 through interconnect 334. In certain embodiments, the camera interface unit 386 may be configured to directly control strobe unit 336 by transmitting control commands to the strobe unit 336 through strobe control signal 338. By directly controlling both the camera module 330 and the strobe unit 336, the camera interface unit 386 may cause the camera module 330 and the strobe unit 336 to perform their respective operations in precise time synchronization. In one embodiment, precise time synchronization may be less than five hundred microseconds of event timing error. Additionally, event timing error may be a difference in time from an intended event occurrence to the time of a corresponding actual event occurrence.

In another embodiment, camera interface unit 386 may be configured to accumulate statistics while receiving image data from camera module 330. In particular, the camera interface unit 386 may accumulate exposure statistics for a given image while receiving image data for the image through interconnect 334. Exposure statistics may include, without limitation, one or more of an intensity histogram, a count of over-exposed pixels, a count of under-exposed pixels, an intensity-weighted sum of pixel intensity, or any combination thereof. The camera interface unit 386 may present the exposure statistics as memory-mapped storage locations within a physical or virtual address space defined by a processor, such as one or more of CPU cores 370, within processor complex 310. In one embodiment, exposure statistics reside in storage circuits that are mapped into a memory-mapped register space, which may be accessed through the interconnect 334. In other embodiments, the exposure statistics are transmitted in conjunction with transmitting pixel data for a captured image. For example, the exposure statistics for a given image may be transmitted as in-line data, following transmission of pixel intensity data for the captured image. Exposure statistics may be calculated, stored, or cached within the camera interface unit 386. In other embodiments, an image sensor controller within camera module 330 may be configured to accumulate the exposure statistics and transmit the exposure statistics to processor complex 310, such as by way of camera interface unit 386. In one embodiment, the exposure statistics are accumulated within the camera module 330 and transmitted to the camera interface unit 386, either in conjunction with transmitting image data to the camera interface unit 386, or separately from transmitting image data.

In one embodiment, camera interface unit 386 may accumulate color statistics for estimating scene white-balance. Any technically feasible color statistics may be accumulated for estimating white balance, such as a sum of intensities for different color channels comprising red, green, and blue color channels. The sum of color channel intensities may then be used to perform a white-balance color correction on an associated image, according to a white-balance model such as a gray-world white-balance model. In other embodiments, curve-fitting statistics are accumulated for a linear or a quadratic curve fit used for implementing white-balance correction on an image. As with the exposure statistics, the color statistics may be presented as memory-mapped storage locations within processor complex 310. In one embodiment, the color statistics may be mapped in a memory-mapped register space, which may be accessed through interconnect 334. In other embodiments, the color statistics may be transmitted in conjunction with transmitting pixel data for a captured image. For example, in one embodiment, the color statistics for a given image may be transmitted as in-line data, following transmission of pixel intensity data for the image. Color statistics may be calculated, stored, or cached within the camera interface 386. In other embodiments, the image sensor controller within camera module 330 may be configured to accumulate the color statistics and transmit the color statistics to processor complex 310, such as by way of camera interface unit 386. In one embodiment, the color statistics may be accumulated within the camera module 330 and transmitted to the camera interface unit 386, either in conjunction with transmitting image data to the camera interface unit 386, or separately from transmitting image data.

In one embodiment, camera interface unit 386 may accumulate spatial color statistics for performing color-matching between or among images, such as between or among an ambient image and one or more images sampled with strobe illumination. As with the exposure statistics, the spatial color statistics may be presented as memory-mapped storage locations within processor complex 310. In one embodiment, the spatial color statistics are mapped in a memory-mapped register space. In another embodiment the camera module may be configured to accumulate the spatial color statistics, which may be accessed through interconnect 334. In other embodiments, the color statistics may be transmitted in conjunction with transmitting pixel data for a captured image. For example, in one embodiment, the color statistics for a given image may be transmitted as in-line data, following transmission of pixel intensity data for the image. Color statistics may be calculated, stored, or cached within the camera interface 386.

In one embodiment, camera module 330 may transmit strobe control signal 338 to strobe unit 336, enabling the strobe unit 336 to generate illumination while the camera module 330 is sampling an image. In another embodiment, camera module 330 may sample an image illuminated by strobe unit 336 upon receiving an indication signal from camera interface unit 386 that the strobe unit 336 is enabled. In yet another embodiment, camera module 330 may sample an image illuminated by strobe unit 336 upon detecting strobe illumination within a photographic scene via a rapid rise in scene illumination. In one embodiment, a rapid rise in scene illumination may include at least a rate of increasing intensity consistent with that of enabling strobe unit 336. In still yet another embodiment, camera module 330 may enable strobe unit 336 to generate strobe illumination while sampling one image, and disable the strobe unit 336 while sampling a different image.

Figure 3G:
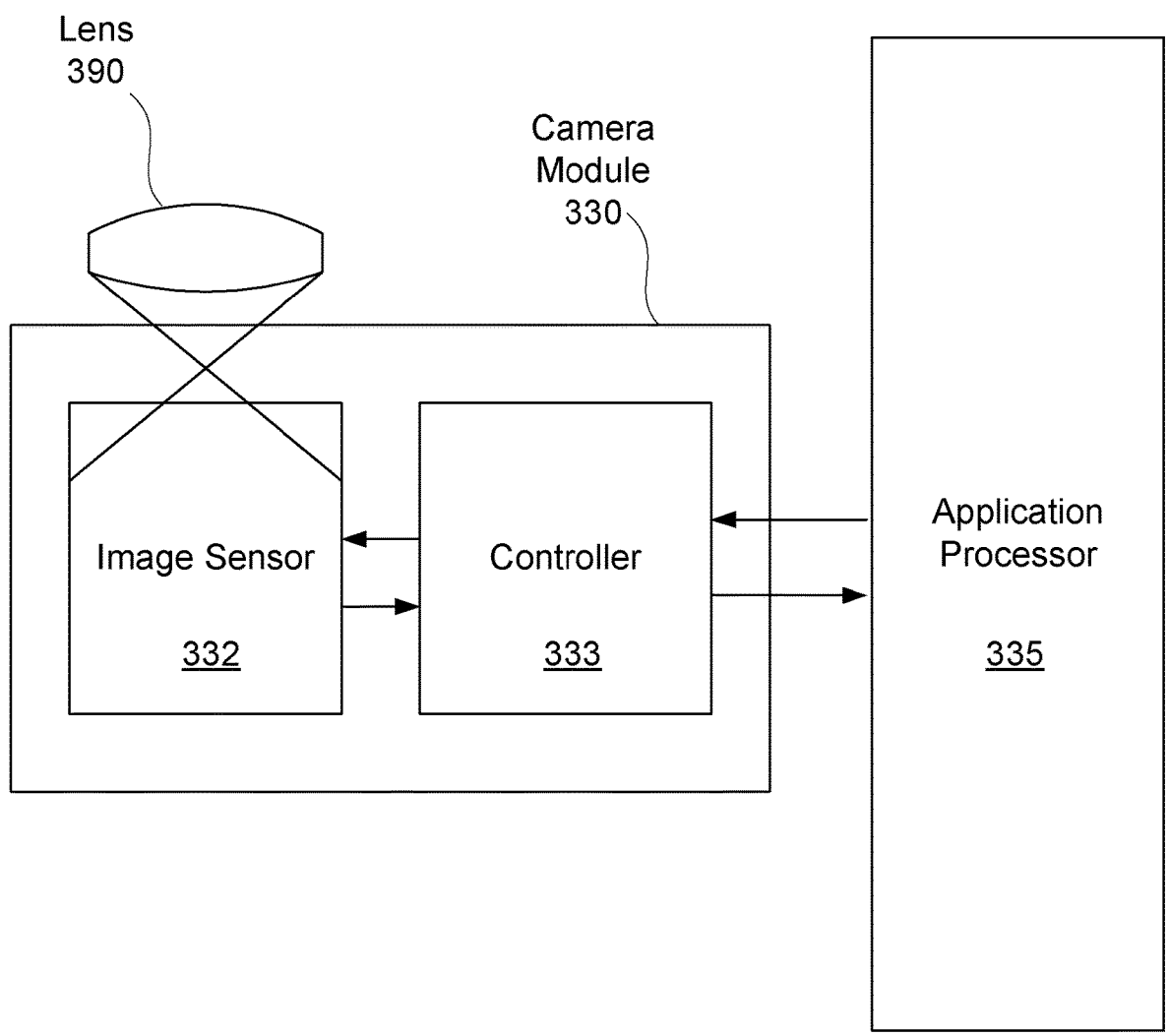
FIG. 3G illustrates a camera module in communication with an application processor, in accordance with an embodiment.

FIG. 3G illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be in communication with an application processor 335. The camera module 330 is shown to include image sensor 332 in communication with a controller 333. Further, the controller 333 is shown to be in communication with the application processor 335.

In one embodiment, the application processor 335 may reside outside of the camera module 330. As shown, the lens 390 may be configured to focus optical scene information to be sampled onto image sensor 332. The optical scene information sampled by the image sensor 332 may then be communicated from the image sensor 332 to the controller 333 for at least one of subsequent processing and communication to the application processor 335. In another embodiment, the controller 333 may control storage of the optical scene information sampled by the image sensor 332, or storage of processed optical scene information.

In another embodiment, the controller 333 may enable a strobe unit to emit strobe illumination for a short time duration (e.g. less than ten milliseconds) after image sensor 332 completes an exposure time associated with sampling an ambient image. Further, the controller 333 may be configured to generate strobe control signal 338 in conjunction with controlling operation of the image sensor 332.

In one embodiment, the image sensor 332 may be a complementary metal oxide semiconductor (CMOS) sensor or a charge-coupled device (CCD) sensor. In another embodiment, the controller 333 and the image sensor 332 may be packaged together as an integrated system, multi-chip module, multi-chip stack, or integrated circuit. In yet another embodiment, the controller 333 and the image sensor 332 may comprise discrete packages. In one embodiment, the controller 333 may provide circuitry for receiving optical scene information from the image sensor 332, processing of the optical scene information, timing of various functionalities, and signaling associated with the application processor 335. Further, in another embodiment, the controller 333 may provide circuitry for control of one or more of exposure, shuttering, white balance, and gain adjustment. Processing of the optical scene information by the circuitry of the controller 333 may include one or more of gain application, amplification, and analog-to-digital conversion. After processing the optical scene information, the controller 333 may transmit corresponding digital pixel data, such as to the application processor 335.

In one embodiment, the application processor 335 may be implemented on processor complex 310 and at least one of volatile memory 318 and NV memory 316, or any other memory device and/or system. The application processor 335 may be previously configured for processing of received optical scene information or digital pixel data communicated from the camera module 330 to the application processor 335.

Figure 4:
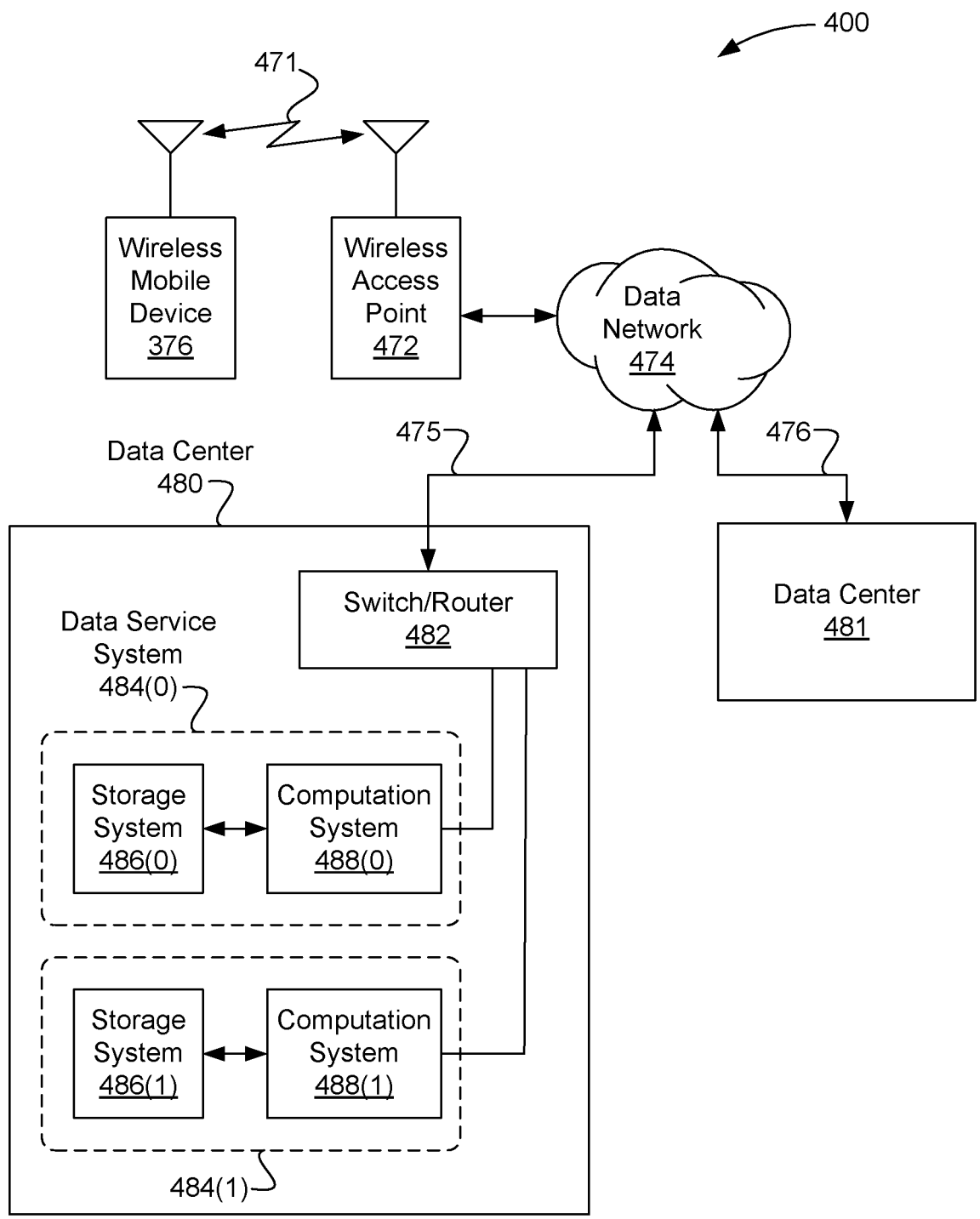
FIG. 4 illustrates a network service system, in accordance with another embodiment.

FIG. 4 illustrates a network service system 400, in accordance with one embodiment. As an option, the network service system 400 may be implemented in the context of the details of any of the Figures disclosed herein. Of course, however, the network service system 400 may be implemented in any desired environment. Further, the aforementioned definitions may equally apply to the description below.

In one embodiment, the network service system 400 may be configured to provide network access to a device implementing a digital photographic system. As shown, network service system 400 includes a wireless mobile device 376, a wireless access point 472, a data network 474, a data center 480, and a data center 481. The wireless mobile device 376 may communicate with the wireless access point 472 via a digital radio link 471 to send and receive digital data, including data associated with digital images. The wireless mobile device 376 and the wireless access point 472 may implement any technically feasible transmission techniques for transmitting digital data via digital radio link 471 without departing the scope and spirit of the present invention. In certain embodiments, one or more of data centers 480, 481 may be implemented using virtual constructs so that each system and subsystem within a given data center 480, 481 may comprise virtual machines configured to perform data processing and network data transmission tasks. In other implementations, one or more of data centers 480, 481 may be physically distributed over a plurality of physical sites.

The wireless mobile device 376 may comprise a smart phone configured to include a digital camera, a digital camera configured to include wireless network connectivity, a reality augmentation device, a laptop configured to include a digital camera and wireless network connectivity, or any other technically feasible computing device configured to include a digital photographic system and wireless network connectivity.

In various embodiments, the wireless access point 472 may be configured to communicate with wireless mobile device 376 via the digital radio link 471 and to communicate with the data network 474 via any technically feasible transmission media, such as any electrical, optical, or radio transmission media. For example, in one embodiment, wireless access point 472 may communicate with data network 474 through an optical fiber coupled to the wireless access point 472 and to a router system or a switch system within the data network 474. A network link 475, such as a wide area network (WAN) link, may be configured to transmit data between the data network 474 and the data center 480.

In one embodiment, the data network 474 may include routers, switches, long-haul transmission systems, provisioning systems, authorization systems, and any technically feasible combination of communications and operations subsystems configured to convey data between network endpoints, such as between the wireless access point 472 and the data center 480. In one implementation scenario, wireless mobile device 376 may comprise one of a plurality of wireless mobile devices configured to communicate with the data center 480 via one or more wireless access points coupled to the data network 474.

Additionally, in various embodiments, the data center 480 may include, without limitation, a switch/router 482 and at least one data service system 484. The switch/router 482 may be configured to forward data traffic between and among a network link 475, and each data service system 484. The switch/router 482 may implement any technically feasible transmission techniques, such as Ethernet media layer transmission, layer 2 switching, layer 3 routing, and the like. The switch/router 482 may comprise one or more individual systems configured to transmit data between the data service systems 484 and the data network 474.

In one embodiment, the switch/router 482 may implement session-level load balancing among a plurality of data service systems 484. Each data service system 484 may include at least one computation system 488 and may also include one or more storage systems 486. Each computation system 488 may comprise one or more processing units, such as a central processing unit, a graphics processing unit, or any combination thereof. A given data service system 484 may be implemented as a physical system comprising one or more physically distinct systems configured to operate together. Alternatively, a given data service system 484 may be implemented as a virtual system comprising one or more virtual systems executing on an arbitrary physical system. In certain scenarios, the data network 474 may be configured to transmit data between the data center 480 and another data center 481, such as through a network link 476.

In another embodiment, the network service system 400 may include any networked mobile devices configured to implement one or more embodiments of the present invention. For example, in some embodiments, a peer-to-peer network, such as an ad-hoc wireless network, may be established between two different wireless mobile devices. In such embodiments, digital image data may be transmitted between the two wireless mobile devices without having to send the digital image data to a data center 480.

Figure 5A:
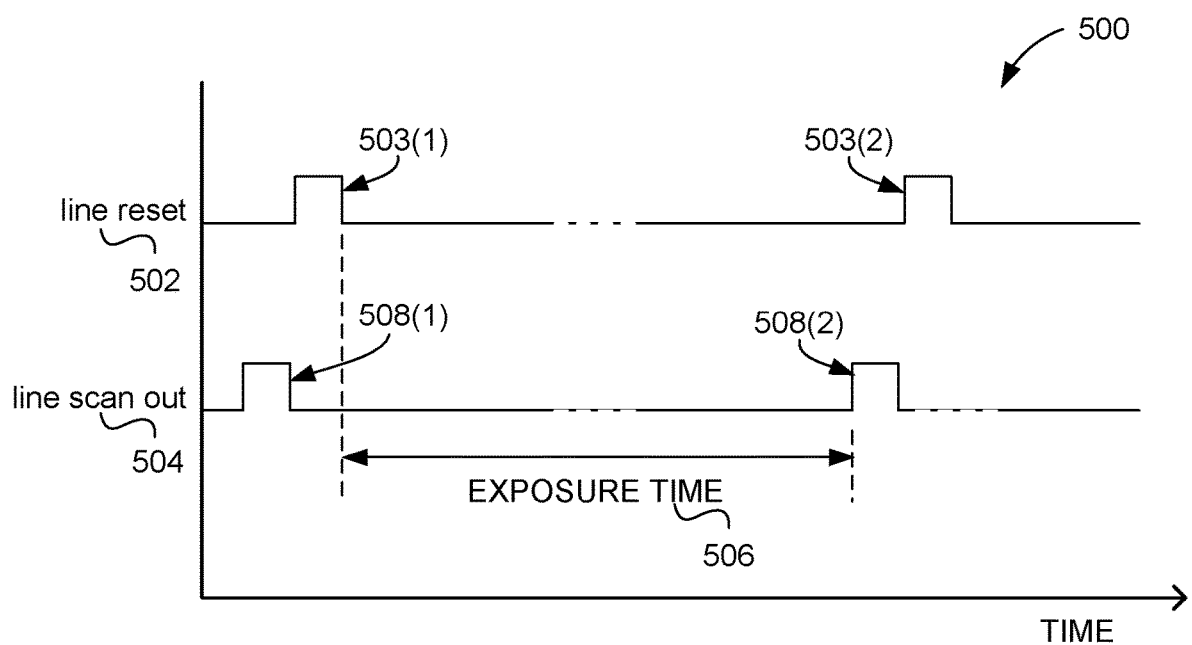
FIG. 5A illustrates a time graph of line scan out and line reset signals for one capture associated with a rolling shutter, in accordance with one embodiment.

FIG. 5A illustrates a time graph 500 of line scan out and line reset for one capture associated with a rolling shutter, in accordance with one embodiment. As an option, signals depicted in the time graph 500 may be implemented in the context of any one or more of the embodiments set forth in any previous and/or subsequent figure(s) and/or description thereof. Of course, however, the time graph 500 may depict signals implemented in the context of any desired environment. Further, the aforementioned definitions may equally apply to the description below.

As shown in time graph 500, a line reset signal 502 indicates two line reset occurrences 503 of the same line (of pixels) within an image sensor. Of course, in various embodiments, any number of line resets may be included. For example, a number of line reset signals corresponding to the number of lines of pixels in the image sensor may be implemented within the image sensor. In one embodiment, one of the line reset signals may be asserted (depicted as a positive signal pulse) at a time to generate one corresponding line reset occurrence at a time. Further, a line scan out signal 504 indicates two line scan-out occurrences 508 of the line. As shown, an exposure time 506 begins after a line reset occurrence 503(1) has completed but before a line scan out occurrence 508(2) begins.

In one embodiment, a given line reset occurrence 503 correlates with a corresponding line scan-out occurrence 508. For example, a line scan-out occurrence 508(1) may be followed by a line reset occurrence 503(1). During operation, a line (of pixels) may be reset, then exposed during exposure time 506, then scanned out, and then reset again to maintain a given exposure in sequential frames. Of course, exposure parameters may change in sequential frames, such as to adapt to changing scene conditions.

Figure 5B:
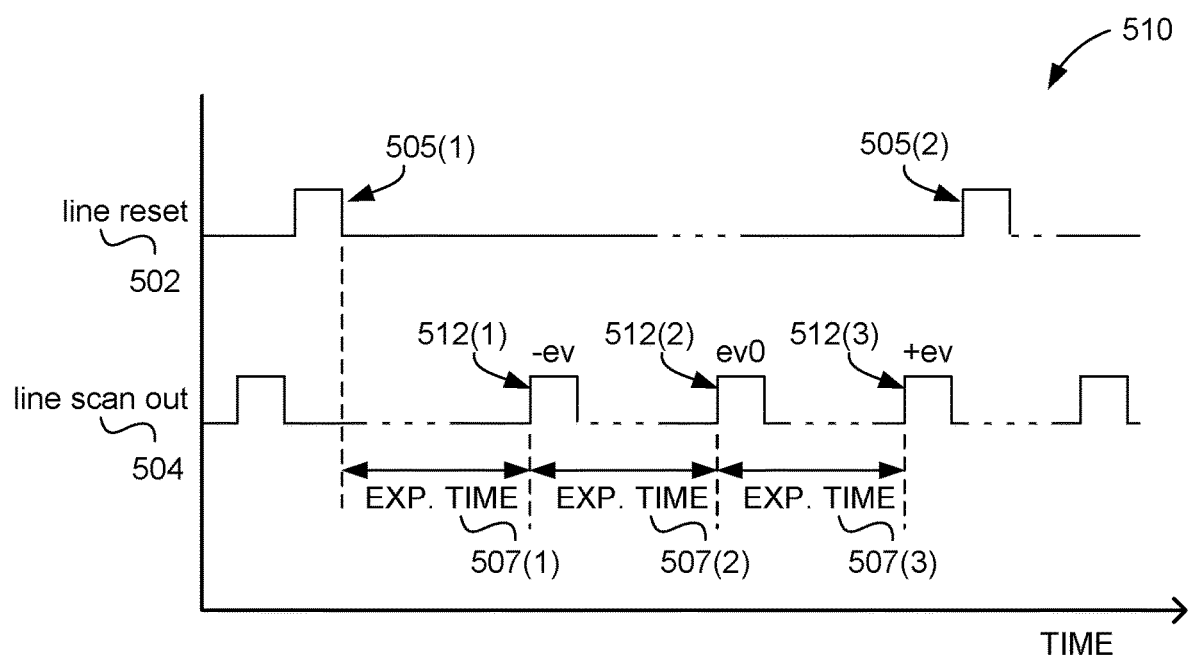
FIG. 5B illustrates a time graph of line scan out and line reset signals for capturing three frames having increasing exposure levels using a rolling shutter, in accordance with one embodiment.

FIG. 5B illustrates a time graph 510 of line scan out and line reset signals for capturing three frames having increasing exposure levels using a rolling shutter, in accordance with one embodiment. As an option, signals depicted in the time graph 510 may be implemented in the context of any one or more of the embodiments set forth in any previous and/or subsequent figure(s) and/or description thereof. Of course, however, the time graph 510 may depict signals implemented in the context of any desired environment. Further, the aforementioned definitions may equally apply to the description below.

As shown, line reset signal 502 indicates two line reset occurrences 505 on time graph 510. Further, a line scan out signal 504 includes three scan out occurrences including an underexposed (−ev) capture at scan out occurrence 512(1), a properly/normally exposed (ev 0) capture at scan out occurrence 512(2), and an over exposed (+ev) capture at scan out occurrence 512(3). Of course, in other embodiments, any number of scan out occurrences may be included to capture any combination of exposure levels. In time graph 510, the three scan out occurrences 512 may represent three different f/stop values, three different ISO values, in conjunction with scan out occurrences 512. Further, an exposure time 507 begins after a line reset occurrence 505(1) has completed but before a line scan out occurrence (e.g., 512(1)) begins. Exposure times 507 may be held constant between each capture (e.g., exposure time 507(1) is equal to exposure time 507(2), and so forth). Alternatively, exposure times 507 may be caused to vary, for example to generate asymmetric exposures (e.g., exposure time 507(1), exposure time 507(2), and exposure time 507(3) are not equal). Furthermore, a different number of frames (e.g., two, four or more) may be captured, each having increasing exposure.

Figure 6A:
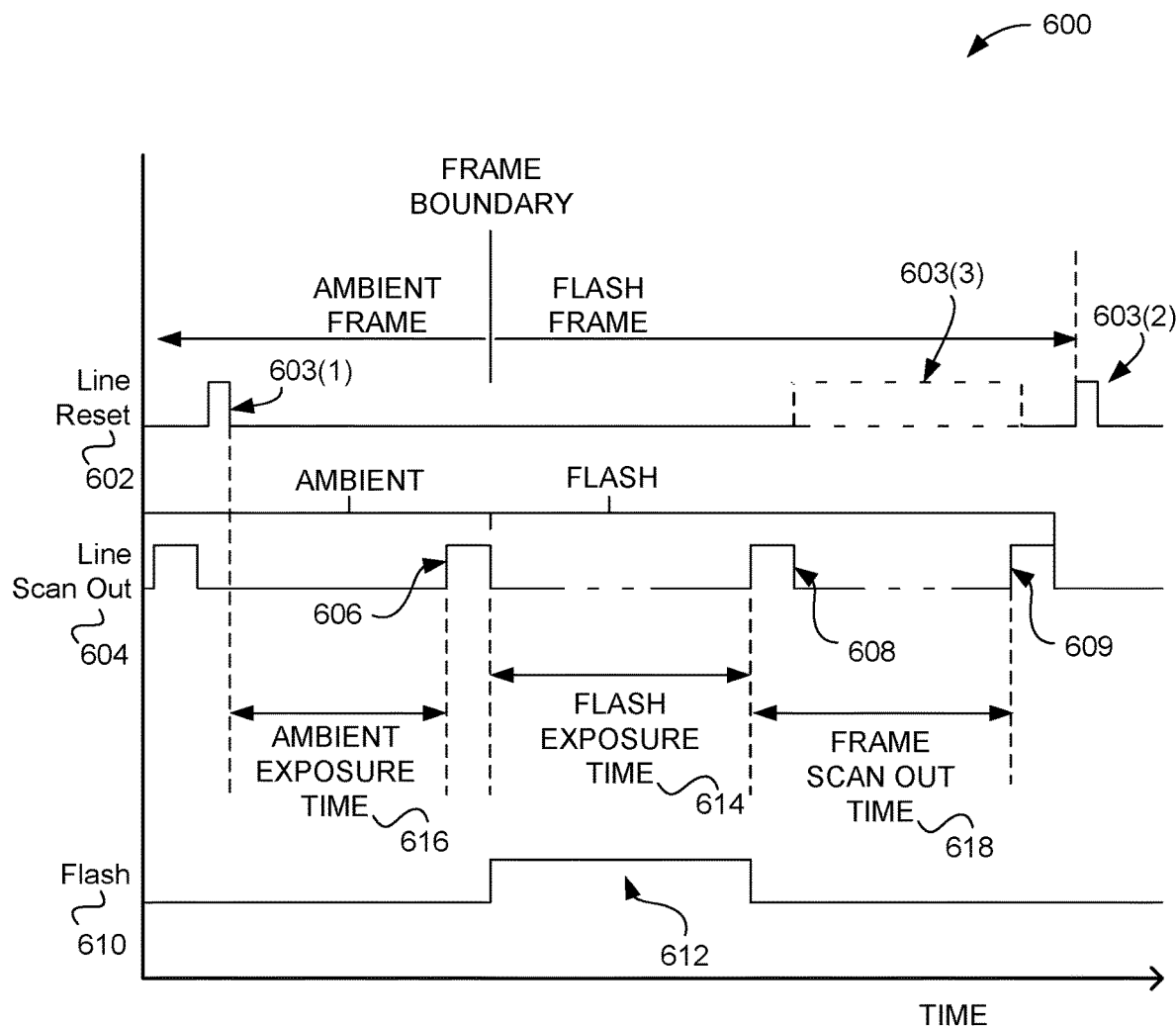
FIG. 6A illustrates a time graph of a line reset, an ambient exposure time, a flash activation, a flash exposure time, and scan out for two frame captures performed with a rolling shutter image sensor, in accordance with one embodiment.

FIG. 6A illustrates a time graph 600 of a line reset, an ambient exposure time, a flash activation, a flash exposure time, and scan out for two frame captures performed with a rolling shutter image sensor, in accordance with one embodiment. As an option, the two captures depicted in the time graph 600 may be implemented in the context of any one or more of the embodiments set forth in any previous and/or subsequent figure(s) and/or description thereof. Of course, however, the two captures depicted in time graph 600 may be implemented in the context of any desired environment. Further, the aforementioned definitions may equally apply to the description below.

As shown, line reset 602 indicates two line reset occurrences 603 on time graph 600. Additionally, line scan out 604 includes an ambient scan-out 606 and a flash scan-out 608. Ambient scan out 606 correlates with an ambient exposure time 616, and flash scan out 608 correlates with a flash exposure time 614. Further, flash 610 indicates an active period 612 which correlates with flash exposure time 614. In one embodiment, a flash circuit (e.g., one or more LEDs or a Xenon strobe) is enabled during active period 612. The flash circuit may be disabled when not in an active period 612.

In one embodiment, an ambient period (corresponding to ambient exposure time 616) may precede a flash period (corresponding to flash exposure time 614). However, in another embodiment, a flash period may precede an ambient period.

In one embodiment, information associated with a properly exposed ambient image may also be used for a flash image. For example, rather than metering for a flash exposure, information gathered during the ambient exposure time may be used during the flash exposure time. In one embodiment, such information (i.e. obtained during the ambient exposure time) may be used as the metering for the flash exposure or a sequence of flash exposures. In another embodiment, metering for the flash exposure may be based on multiple images (e.g. an image set) captured with ambient illumination (e.g., images captured without flash but with increasing exposure time/decreasing shutter speed, etc.).

In another embodiment, illumination conditions may be insufficient to capture a properly exposed ambient image (and no color information may be obtained from the ambient image). In such an embodiment, if the photographic scene is sufficiently dark, then a first active period for the flash 610 may be enabled for pre-metering (e.g. pre-flash or flash metering, TTL metering, automatic-TTL metering, etc.), which may be followed by an ambient period (i.e. non-flash capture) corresponding with an ambient exposure time 616, and then a second active period for the flash 610 corresponding with a flash exposure time 614.

Additionally, although an ambient exposure time 616 and a flash exposure time 614 are represented as separate time periods, it should be noted that no line reset (e.g., line reset occurrence 603) may be performed between the ambient exposure time 616 and the flash exposure time 614; consequently, the flash capture (corresponding with flash scan out 608) is based on the combination of both ambient exposure time 616 and flash exposure time 614. In one embodiment, ambient scan out 606 may be optional and in some instances, may not even occur.

In one embodiment, an ambient image (e.g., a frame exposed during ambient exposure time 616) associated with ambient scan out 606 may be blended, at least in part, with a flash image (e.g., a frame exposed during flash exposure time 614) associated with flash scan out 608. To that effect, any of the techniques included in U.S. patent application Ser. No. 13/573,252, now U.S. Pat. No. 8,976,264, filed Sep. 4, 2012, entitled "COLOR BALANCE IN DIGITAL PHOTOGRAPHY" (the entire disclosures being incorporated by reference herein) may be used to generate a blended image based on a capture associated with an ambient scan out 606 and a capture associated with a flash scan out 608. In one embodiment, the ambient image provides a dominant color reference for certain pixels and the flash image provides a dominant color reference for certain other pixels in a blended image. Further, in another embodiment, two or more images each associated with a separate scan out may be blended to generate one or more high-dynamic range (HDR) images.

Further, any number of line scan outs (e.g. as shown as ambient scan out 606 and flash scan out 608) may occur between two line reset occurrences 603. In one embodiment, the images captured resulting from each of the line scan outs may be compiled within an image set. In one embodiment, at least some of the images within the image set may be used as the basis for blending and/or creating a final output image. In some embodiments, such a final output image may be the result of at least one ambient image and at least one flash image. In certain embodiments, two or more ambient images having different exposures may be scanned out and combined to generate an HDR ambient image, two or more flash images having different exposures (e.g., different ISO, exposure time, flash intensity, aperture) may be scanned out and combined to generate an HDR flash image. Furthermore, an HDR ambient image may be combined with a flash image to generate a final output image; an ambient image may be combined with an HDR flash image to generate the final output image; and/or, an HDR ambient image may be combined with an HDR flash image to generate the final output image. In each case, exposure time may vary between different images being combined. In one embodiment, an ambient image may be captured and scanned out, followed by a sequence of flash images that are captured to have increasing flash exposure (and increasing overall exposure). The ambient image and the sequence of flash images may be stored in an image stack. Furthermore, the ambient image may be blended with one or more of the flash images to generate a final image. The one or more flash images may be selected to avoid overexposure in regions primarily illuminated by a flash subsystem, which may generate flash illumination using one or more LEDs or a Xenon flash tube. Alternatively, two or more of the flash images may be selected (e.g., based on flash exposure, avoiding overexposure) and blended to generate a final image.

In one embodiment, the flash subsystem may be enabled during active period 612 at a frame boundary for a duration corresponding to the flash exposure time 614. As shown, the frame boundary is between an ambient frame and a flash frame. In this example, ambient scan out 606 may represent scan out of a last line of the image sensor to generate an ambient image, flash scan out 608 may represent scan out for a first line of the image sensor, and flash scan out 609 may represent scan out for a last line of the image sensor to generate a flash image. A frame scan out time 618 may represent a time span needed to scan out a complete frame from the image sensor. As shown, line reset occurrence 603(1) may correspond to a line reset for the last line of the image sensor, and line reset occurrence 603(2) may also correspond to a line reset for the last line of the image sensor. Sequential line reset occurrences 603(3) are not shown as independent events for other lines, but may occur during frame scan out time 618. Exposure may continue between line reset occurrences; consequently, adjusting frame scan out time 618 (e.g., through faster or slower out scan out occurrences) may have the effect of adjusting ambient exposure contribution to the flash image. In certain embodiments, frame scan out time 618 may be constrained to a certain minimum time, such as by analog-to-digital conversion throughput limitations. In such embodiments, the ambient exposure time 616, flash exposure time 614, and frame scan out time 618 may be collectively adjusted to achieve a target ambient illumination exposure time.

In alternative embodiments, a first ambient image may be captured before the flash image, and a second ambient image may be captured after the flash image is captured; in such embodiments, line reset occurrence 603(2) may be delayed until after scan out of the second ambient image. In such embodiments, the flash image may be exposed to provide under exposed ambient illumination, but proper flash illumination on foreground objects; and the second ambient image may be exposed properly. The first ambient image, the flash image, and the second ambient image may be combined to generate a final output image. For example, the first ambient image may contain useful image information for very bright regions, the flash image may contain useful image information for regions needing flash illumination, and the second ambient image may contain useful image information for regions generally and sufficiently lit by ambient illumination—all of which may be combined to generate a final output image. In one embodiment, the second ambient image may be used as the final output image, with color optionally corrected based on color information from the first ambient image.

Figure 6B:
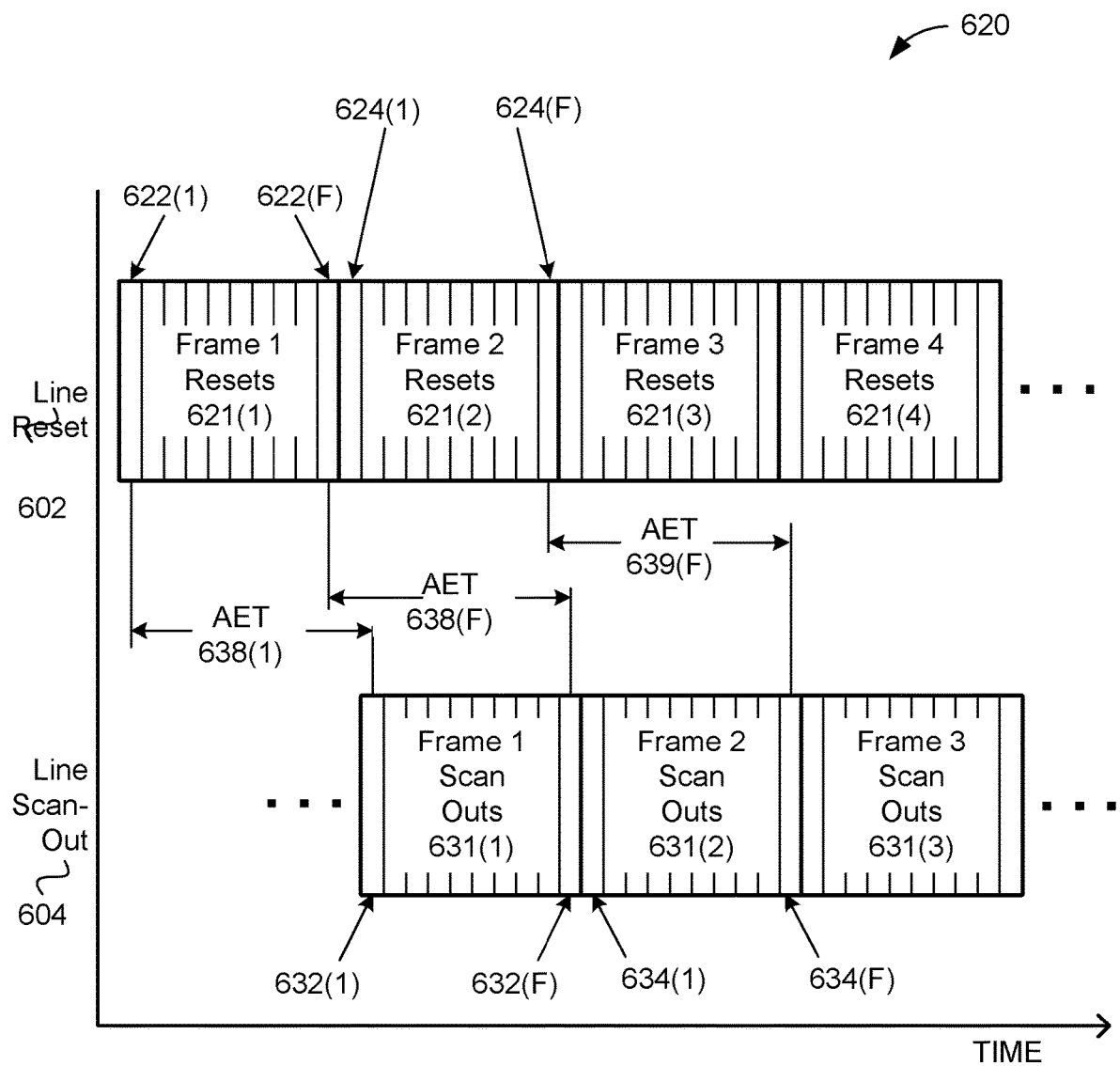
FIG. 6B illustrates a time graph of reset, exposure, and scan out timing for multiple equally exposed frames, in accordance with one embodiment.

FIG. 6B illustrates a time graph 620 of reset, exposure, and scan out timing for multiple equally exposed frames, in accordance with one embodiment. As an option, the time graph 620 may be implemented in the context of any one or more of the embodiments set forth in any previous and/or subsequent figure(s) and/or description thereof. Of course, however, the time graph 620 may be implemented in the context of any desired environment. Further, the aforementioned definitions may equally apply to the description below.

Line reset occurrences 602 are indicated for lines comprising a given frame, and line scan out 604 occurrences are indicated for the lines comprising the frame. Capturing a sequence of frames (frame 1, frame 2, and so forth) is shown to include resetting of individual lines, exposing the individual lines, and scanning out the individual lines.

In one embodiment, an image sensor may include F lines of pixels, and each line of pixels may include an independent reset signal that, when asserted active, causes a line reset occurrence. The line reset occurrence may cause analog storage elements within pixels comprising the line of pixels to reset to an unexposed state. For example, the unexposed state may be defined as a reference voltage stored in an analog storage element; and, during increasing exposure the voltage stored in the analog storage element may decrease towards a ground reference, according to scene intensity at a corresponding pixel. Each reset occurrence for the line may reset the voltage stored in the analog storage element to the reference voltage, and each exposure may change the voltage stored according to intensity at the pixel. Of course, different unexposed and fully exposed voltage schemes may be implemented without departing the scope and spirit of various embodiments.

Frame 1 line resets 621(1) include a line 1 reset 622(1) for line 1, line resets for lines 2 through F−1 (not shown), and a line F reset 622(F) for line F. Similarly, frame 2 line resets 621(2) include a line 1 reset 624(1) for line 1 through a line F reset 624(F) for line F, and so forth. Furthermore, frame 1 line scan outs 631(1) include a line 1 scan out 632(1) for line 1, line scan outs for lines 2 through F−1 (not shown), and a line F scan out 632(F) for line F. Similarly, frame 2 scan outs 631(2) include a line 1 scan out 634(1) for line 1 of frame 2, line scan outs for lines 2 through F−1 for frame 2 (not shown), and a line F scan out 634(F) for line F for frame 2.

As shown, an ambient exposure time (AET) 638(1) for line 1 of frame 1 takes place during a time span between line 1 reset 622(1) and line 1 scan out 632(1) for frame 1. That is, line 1 of the image sensor is exposed during the AET 638(1). Similarly, an AET 638(F) takes place during a time span between line F reset 622(F) for frame 1 and line F scan out 632(F) for frame 1. That is, line F of the image sensor is exposed during the AET 638(F). In general, AET 638(1) is equal in length to AET 638(F), but AET 638(1) and AET 638(F) may occur at different times, with AET 638(F), in one embodiment, occurring after AET 638(1). Furthermore, lines 2 through F−1 (not shown) are also exposed for an ambient exposure time (not shown), with each ambient exposure time occurring after a precious ambient exposure time for sequential lines. As shown, an AET 639(F) corresponds to an AET for line F of frame 2. In one embodiment, duration times for each of AET 638(1) through AET 638(F) and AET 639(F) may be equal.

Figure 6C:
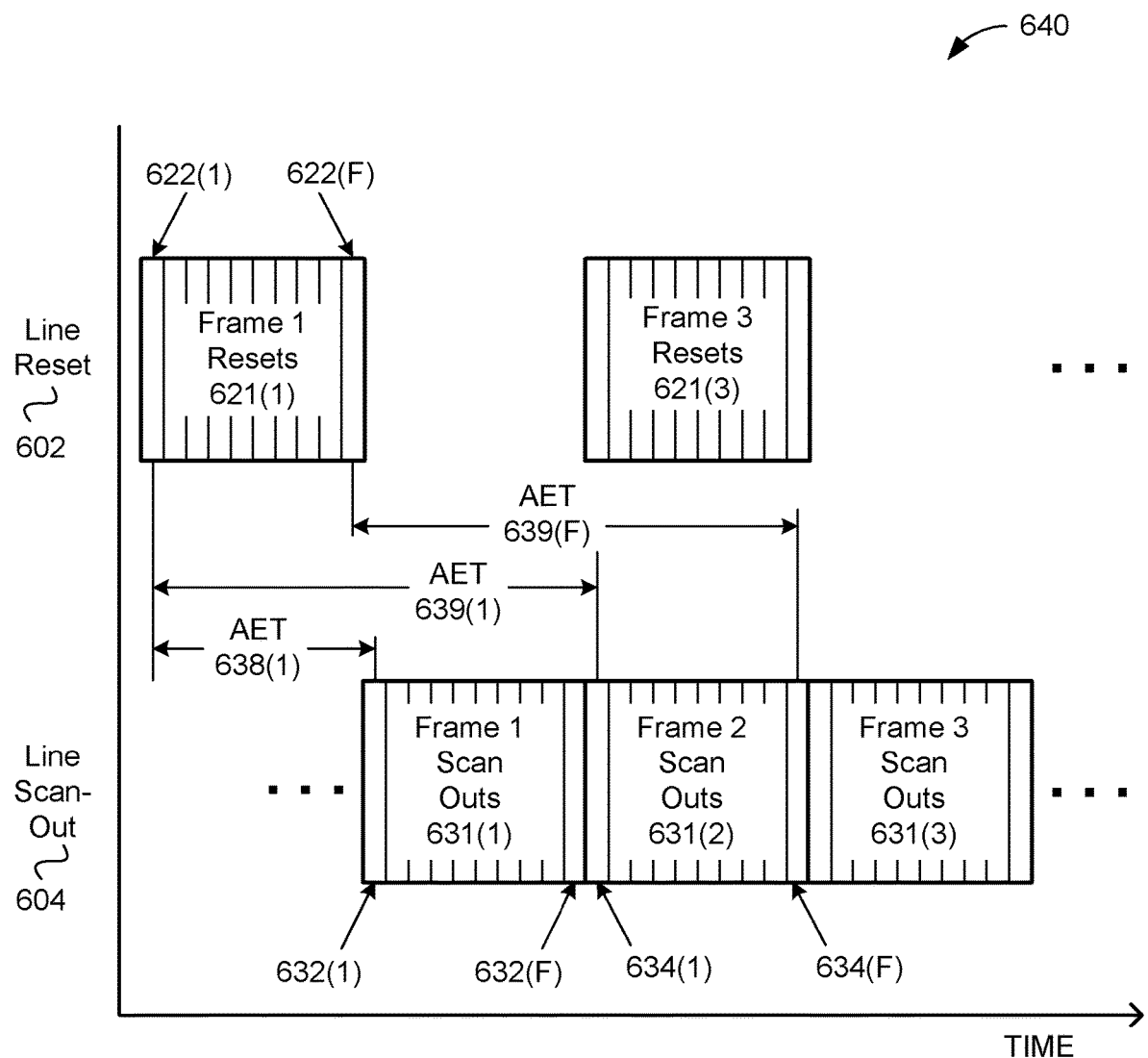
FIG. 6C illustrates a time graph of reset, exposure, and scan out timing for two frames, in accordance with one embodiment.

FIG. 6C illustrates a time graph 640 of reset, exposure, and scan out timing for two frames, in accordance with one embodiment. As an option, the time graph 640 may be implemented in the context of any one or more of the embodiments set forth in any previous and/or subsequent figure(s) and/or description thereof. Of course, however, the time graph 640 may be implemented in the context of any desired environment. Further, the aforementioned definitions may equally apply to the description below.

Frame 1 line resets 621(1) include a line 1 reset 622(1) for line 1, line resets for lines 2 through F−1 (not shown), and a line F reset 622(F) for line F. Furthermore, no line resets are performed for a frame 2 (but scan-outs are associated with frame 2 as will be explained below). Instead, exposure may continue to accumulate so that frame 2 has a higher exposure than frame 1. Frame 1 line scan outs 631(1) may include a line 1 scan out 632(1) for line 1 of frame 1, line scan outs for lines 2 through F−1 (not shown) of frame 1, and a line F scan out 632(F) for line F of frame 1. Similarly, frame 2 scan outs 631(2) may include a line 1 scan out 634(1) for line 1, line scan outs for lines 2 through F−1 (not shown), and a line F scan out 634(F) for line F. Furthermore, AET 638(1) may represent exposure time for line 1 of frame 1, AET 639(1) may represent exposure time for line 1 of frame 2, and AET 639(F) may represent exposure time for line F of frame 2. As shown, exposure times associated with AET 639(1) may be larger than exposure times associated with AET 638(1); consequently, exposure for frame 2 may be higher than exposure for frame 1.

Figure 6D:
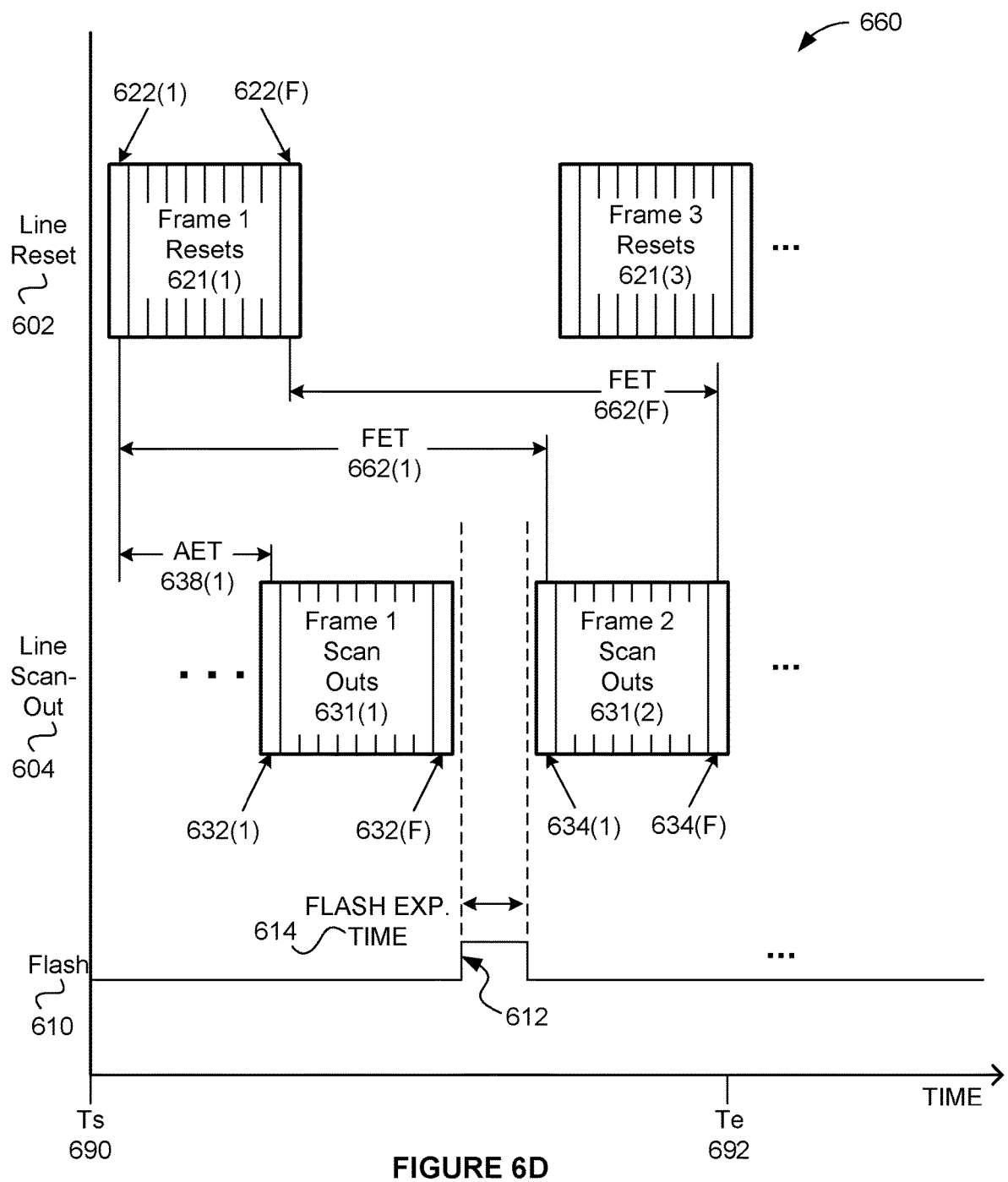
FIG. 6D illustrates a time graph of reset, exposure, and scan out for an ambient frame and a flash frame, in accordance with one embodiment.

FIG. 6D illustrates a time graph 660 of reset, exposure, a flash active period, and scan out for an ambient frame and a flash frame, in accordance with one embodiment. As an option, the time graph 660 may be implemented in the context of any one or more of the embodiments set forth in any previous and/or subsequent figure(s) and/or description thereof. Of course, however, the time graph 660 may be implemented in the context of any desired environment. Further, the aforementioned definitions may equally apply to the description below.

Frame 1 line resets 621(1) include a line 1 reset 622(1) for line 1, line resets for lines 2 through F−1 (not shown), and a line F reset 622(F) for line F. Furthermore, no line resets are performed for frame 2 (but scan-outs are associated with frame 2 as will be explained below). Instead, exposure may continue to accumulate so that frame 2 has a higher exposure than frame 1. Exposure accumulation for frame 2 may include accumulating flash illumination provided during flash active period 612. Frame 1 line scan outs 631(1) may include a line 1 scan out 632(1) for line 1 of frame 1, line scan outs for lines 2 through F−1 (not shown) of frame 1, and a line F scan out 632(F) for line F of frame 1. Similarly, frame 2 scan outs 631(2) may include a line 1 scan out 634(1) for line 1, line scan outs for lines 2 through F−1 (not shown), and a line F scan out 634(F) for line F. Furthermore, AET 638(1) may represent exposure time for line 1 of frame 1, flash exposure time (FET) 662(1) may represent exposure time for line 1 of frame 2, and FET 662(F) may represent exposure time for line F of frame 2. As shown, exposure times associated with FET 662 are larger than exposure times associated with AET 638; consequently, exposure for frame 2 may be higher than exposure for frame 1. In one embodiment, frame 2 is a flash image exposed according to an ambient exposure time for FET 662 in addition to flash exposure time 614 during flash active period 612. In certain embodiments, AET 638(1) may be metered to generate an underexposed ambient image, and FET 662(1) may be metered to generate well-exposed regions illuminated by flash illumination and well-exposed or over-exposed regions illuminated by ambient illumination. Frame 3 line resets 621(3) may include a line reset for lines within the image sensor. A reset for line 1 of frame 3 may occur after scan out for line 1 of frame 2. Frame 3 line resets 621(3) may prepare the image sensor to capture another ambient frame.

In one embodiment, the image sensor (e.g., image sensor 332) is configured to use at least two different analog gains for performing frame scan out. For example, frame 1 scan outs 631(1) may be performed using a first analog gain and frame 2 scan outs 631(2) may be performed using a second, different analog gain. In certain embodiments, the first analog gain (used for scanning out ambient frame) may be higher than the second analog gain (used for scanning out flash frame), causing the ambient frame to have a higher exposure in ambient-lit regions than the flash frame, despite the longer overall exposure time of the flash frame. In certain embodiments, the second analog gain is calculated to provide substantially equivalent exposure (e.g., within +/−0.125 ev) in ambient-lit regions for the ambient frame and the flash frame despite the longer exposure time of the flash frame. In certain embodiments, frame 2 scan outs 631(2) may be performed at a higher rate (e.g., shorter scan out time per line) than frame 1 scan outs 631(1), thereby reducing additional ambient-lit exposure within the flash frame and reducing additional motion blur associated with camera position and/or scene subjects.

In one embodiment, an image set may include frame 1 and frame 2, captured between a start time (Ts) 690 and an end time (Te) 692. One or more image sets may be captured, with one of the image sets being selected and saved, based on device motion. For example, an accelerometer and/or gyroscope comprising sensor devices 342 may provide an estimate of device motion between start time 690 and end time 692 for each of one or more image sets, with one image set having the least motion being selected to be saved and used to generate a final output image. In another example, pixel motion within at least one of frames 1 and 2 may be used to estimate device motion between start time 690 and end time 692 for each of the one or more image sets, with the one image set having the least pixel motion being selected to be saved and used to generate a final output image. In such embodiments, multiple image sets may be captured, with one image set having the least motion and therefore the least likelihood of visible motion blur being saved and used to generate a final output image.

Figure 6E:
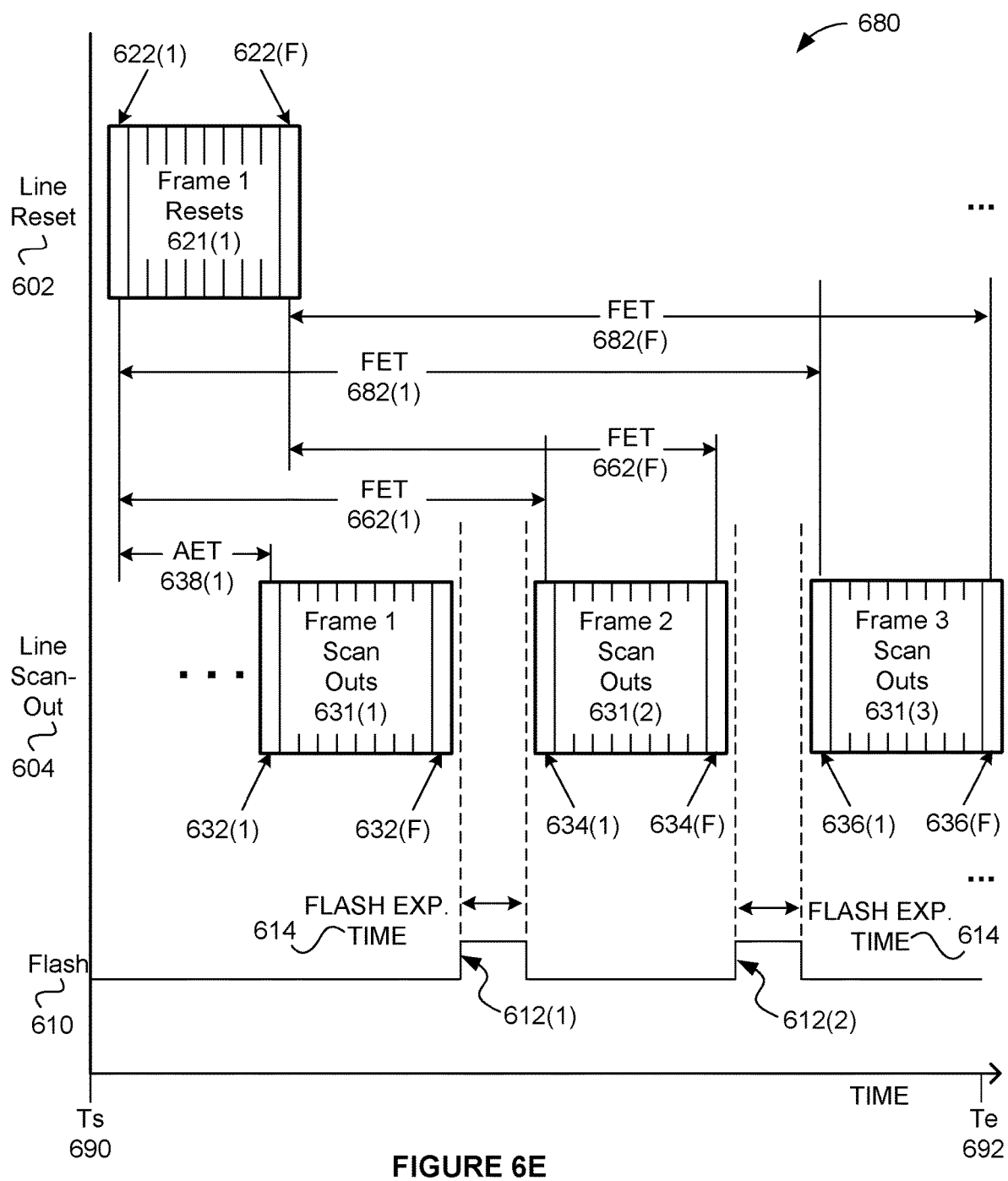
FIG. 6E illustrates a time graph of reset, exposure, and scan out for an ambient frame and two sequential flash frames, in accordance with one embodiment.

FIG. 6E illustrates a time graph 680 of reset, exposure, and scan out for an ambient frame and two sequential flash frames, in accordance with one embodiment. As an option, the time graph 660 may be implemented in the context of any one or more of the embodiments set forth in any previous and/or subsequent figure(s) and/or description thereof. Of course, however, the time graph 660 may be implemented in the context of any desired environment. Further, the aforementioned definitions may equally apply to the description below.

Frame 1 line resets 621(1) include a line 1 reset 622(1) for line 1, line resets for lines 2 through F−1 (not shown), and a line F reset 622(F) for line F. Frame 1 line scan outs 631(1) may include a line 1 scan out 632(1) for line 1 of frame 1, line scan outs for lines 2 through F−1 (not shown) of frame 1, and a line F scan out 632(F) for line F of frame 1. Frame 2 scan outs 631(2) may include a line 1 scan out 634(1) for line 1, line scan outs for lines 2 through F−1 (not shown), and a line F scan out 634(F) for line F. Similarly, frame 3 scan outs 631(3) may include a line 1 scan out 636(1) for line 1, line scan outs for lines 2 through F−1 (not shown), and a line F scan out 636(F) for line F. FET 682(1) represents an exposure time for line 1 of frame 3, while FET 682(F) represents an exposure time for line F of frame 3. In one embodiment, FET 682(1) is equal in duration to 682(F), and FET 682(1) is longer in duration relative to FET 662(F).

Time graph 680 includes two flash active periods 612(1) and 612(2), as well as a second flash image scan out, shown as frame 3 scan outs 631(3). While one ambient frame (frame 1) and two flash frames (frames 2 and 3) are shown here, additional ambient frames may also be captured and/or additional flash frames may also be captured.

In one embodiment, flash exposure time 614 is the same for flash active period 612(1) and flash active period 612(2). In certain embodiments, flash intensity is also the same for flash active period 612(1) and flash active period 612(2). In other embodiments, flash intensity and/or flash active periods may vary in any of the frames. For example, in one embodiment, flash intensity may vary by increasing in sequential frames (as illustrated in FIG. 7).

In one embodiment, an image set may include frame 1, frame 2, and frame 3, captured between a start time (Ts) 690 and an end time (Te) 692. One or more image sets may be captured, with one of the image sets being selected and saved, based on device motion. For example, an accelerometer and/or gyroscope comprising sensor devices 342 may provide an estimate of device motion between start time 690 and end time 692 for each of one or more image sets, with one image set having the least motion being selected to be saved and used to generate a final output image. In another example, pixel motion within at least one of frames 1 to 3 (or any number of frames) may be used to estimate device motion between start time 690 and end time 692 for each of the one or more image sets, with the one image set having the least pixel motion being selected to be saved and used to generate a final output image. In such embodiments, multiple image sets may be captured, with one image set having the least motion and therefore the least likelihood of visible motion blur being saved and used to generate a final output image.

Figure 7:
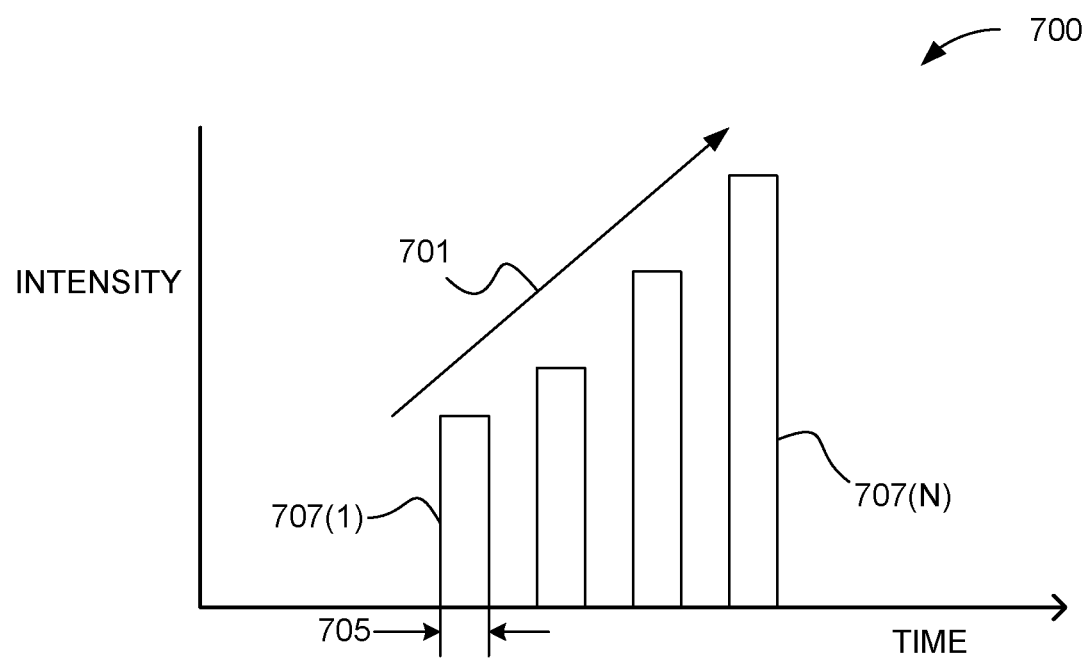
FIG. 7 illustrates a time graph of linear intensity increase for a flash, in accordance with one embodiment.

FIG. 7 illustrates a time graph 700 of linear intensity increase for a flash, in accordance with one embodiment. As an option, the time graph 700 may be implemented in the context of any one or more of the embodiments set forth in any previous and/or subsequent figure(s) and/or description thereof. Of course, however, the time graph 700 may be implemented in the context of any desired environment. Further, the aforementioned definitions may equally apply to the description below.

As shown, time graph 700 includes a time variable on the x-axis and intensity value on the y-axis. The intensity on the y-axis corresponds with a flash intensity. For example, flash intensity of time graph 700 may correspond to the flash intensity of strobe unit 336 plotted as a function of time. As shown, the intensity may increase 701 in a consistent fashion (i.e. same increase at each interval). In one embodiment, the increase 701 may be linear. In one embodiment, the increase 701 may be performed as part of a metering operation in preparation for capturing a flash image, wherein different flash intensity values are used to capture metering images for determining exposure parameters. In another embodiment, the increase 701 is performed to capture a sequence of flash images having different exposures.

As shown, time graph 700 includes a set of one or more flash occurrences 707(1)-707(N). Further, duration 705 may be determined, adjusted, or specified for each flash occurrence (e.g. among flash occurrences 707(1)-707(N)).

In one embodiment, time graph 700 may represent intensity values generated using pulse width modulation (PWM). PWM may be used to control the flash output associated with a LED flash. In this manner, PWM may be used to produce uniform (e.g. same time length) flash spikes of variable duration. Of course, in another embodiment, direct current may be used to control LED flash as well. In one embodiment, a PWM cycle or direct current approach may be used with a Xenon flash (e.g. to control duration of flash).

In one embodiment, a first goal of metering an ambient image (e.g. as it may relate to operation 102, operation 106, operation 202, operation 206, etc.) may include ensuring that the entire ambient image achieves a correct exposure (e.g. a majority of pixels in the middle of a histogram, or a median histogram value of a mid-range intensity value). Furthermore, a second goal of metering can apply to a flash image, wherein the second goal is to ensure that less than a specified threshold percentage of pixels (or a threshold percentage of additional pixels relative to the ambient image) are not overexposed. Exposure parameters for the flash image may be determined such that ambient illuminated portions of the flash image are underexposed and the flash does not overexpose more than the specified threshold of pixels. In this way, blending the ambient image with the flash image may produce a final image with properly exposed ambient illuminated regions and properly exposed flash illuminated regions. In another embodiment, a second goal of metering (e.g. as it may relate to operation 102, operation 106, operation 202, operation 206, etc.) may include constraining an intensity histogram to a specific envelope for high-intensity pixels. For example, in a system with intensity values ranging from 0.0 to 1.0, an intensity histogram envelope may specify that less than a first threshold (e.g., 6%) of pixels may fall within a first intensity range (e.g., 0.90 to 0.95), a second threshold (e.g., 3%) of pixels may fall within a second intensity range (e.g., 0.95 to 0.98), and a third threshold of pixels (e.g., 1%) may fall within a third intensity range (e.g., 0.98 to 1.0). This exemplary histogram envelop includes three steps, but other histogram envelopes may include more or fewer steps, may define functions such as straight lines, and may cover different intensity ranges. Such embodiments can operate to provide an ambient image that, when combined with a flash image, provide a final output image with sufficient illumination for relevant subject matter. For example, in a scene with a poorly illuminated foreground subject but adequate background illumination, an ambient image may be metered and captured to provide a portion of scene lighting for a final output image, while the flash image only needs to illuminate a foreground subject. The presently disclosed technique for constraining exposure parameters for the flash image relative to the ambient image allows for each of the flash image and ambient image to provide useful information to the combined final image.

In one embodiment, a percentage (e.g. 2-3%, etc.) may be used as a ceiling to the number of permitted overexposed pixels. Of course, in other embodiments, any percentage may be used (e.g. as predetermined by the system and/or user, as determined in real-time based on the size of the captured image, etc.).

In another embodiment, a location may be used as a point of interest frame to restrict overexposed pixels. For example, a face may be determined to be a point of interest in an image, and a frame may be constructed around the face such that no pixels (or no more than a set ceiling percentage) are overexposed within such a frame. Of course, a frame may be constructed around any object which may be further determined automatically (e.g. object detection, etc.) or manually selected (e.g. by a user, etc.). In such an embodiment, using a point of interest may be a basis for determining a framing location by which the exposure of pixels may be calculated.

Still yet, in one embodiment, a correctly exposed (e.g. majority of pixels in the middle of an image intensity histogram, a median intensity centered in an image histogram, etc.) ambient image (e.g. as captured via, e.g., ambient scan out 606) may be combined with a correctly exposed or constrained exposure flash image (e.g. as captured, via, e.g., flash scan out 608). In another embodiment, data captured from the ambient exposure time (e.g. exposure settings, white balance, etc.) may be used as a basis for the flash exposure time. In yet another embodiment, ambient exposure parameters including exposure time and ISO may be traded off (e.g., increased ISO value traded off against shorter exposure time) when taking the flash image. Further, such data obtained from the ambient exposure time and/or ambient image may be used in post-processing of the resulting captured image. For example, a frame white balance and/or color correction map (e.g., referenced to ambient image) may be applied to the flash image to correct the color of the flash image to be consistent with the ambient image as discussed herein.

In one embodiment, data obtained from the ambient exposure time (e.g. corresponding to ambient exposure time 616) may be used to influence the flash (e.g. active period 612). For example, an ambient exposure time may determine how much light is present and where the point of interest is located (e.g. pixel coordinates, distance away from camera, etc.). Such data may be used to select what the duration (e.g. duration 705, etc.), the frequency (e.g. frequency 703, etc.), and potentially even the flash type (e.g. time graph 700). In this manner, data gleaned from the ambient exposure time (e.g. 616) may directly influence the flash settings which are implemented during the flash exposure time 614. Further, in some embodiments, data obtained from the ambient exposure time 616 may dictate both the flash exposure time 614 and the flash active period 612.

In one embodiment, data obtained from ambient exposure time 616 may remove the need for a pre-metering of flash. For example, in one embodiment, based on the intensity of light in combination with how close the point of interest object is to the camera, a flash amount may be estimated.

Still yet, in another embodiment, a flash may be influenced by multiple points of interest. For example, two faces may be identified and the amount of flash may be based either individually on each of the two faces (e.g. take two captures, each capture being optimized for one or the other face), or on the global histogram of just the two faces (e.g. a histogram output based on the frames around the two faces). In another embodiment, it may be desired to focus the entire frame of the image in addition to a single (or multiple) points of interest. In such an embodiment, a flash may need to compensate for both a scene focus (e.g. global image) and a point of interest focus.

In one embodiment, a line scan out may be obtained after a first set time (e.g. based on distance to the point of interest) whereas a second line scan out may be obtained for a second set time (e.g. based on correct exposure for the entire scene). In this manner, flash settings may be optimized based on the distance to each object, the frame(s) (e.g. of a scene, of an object, etc.), the focus (e.g. point of focus may correspond with a point of interest, etc.), etc.

Additionally, in one embodiment, one or more automatic actions may be taken based on a point of interest. For example, in one embodiment, selecting a point of interest may automatically cause the point of interest to be in focus, and any surrounding objects to be defocused. Further, a point of interest may be tracked such that the location of the point of interest (i.e. the current pixel coordinates associated with the point of interest) is dynamically updated and the corresponding focus of the location for the point of interest is updated.

In another embodiment, although time graph 600 may be applied to a rolling shutter scenario (e.g. include scan line-out 604, etc.), the principle of using a combined ambient exposure time (e.g. 616) and a flash exposure time (e.g. 614) in combination for an image capture (e.g. flash scan out 608) may be applied to a global shutter system as well.

Figure 8:
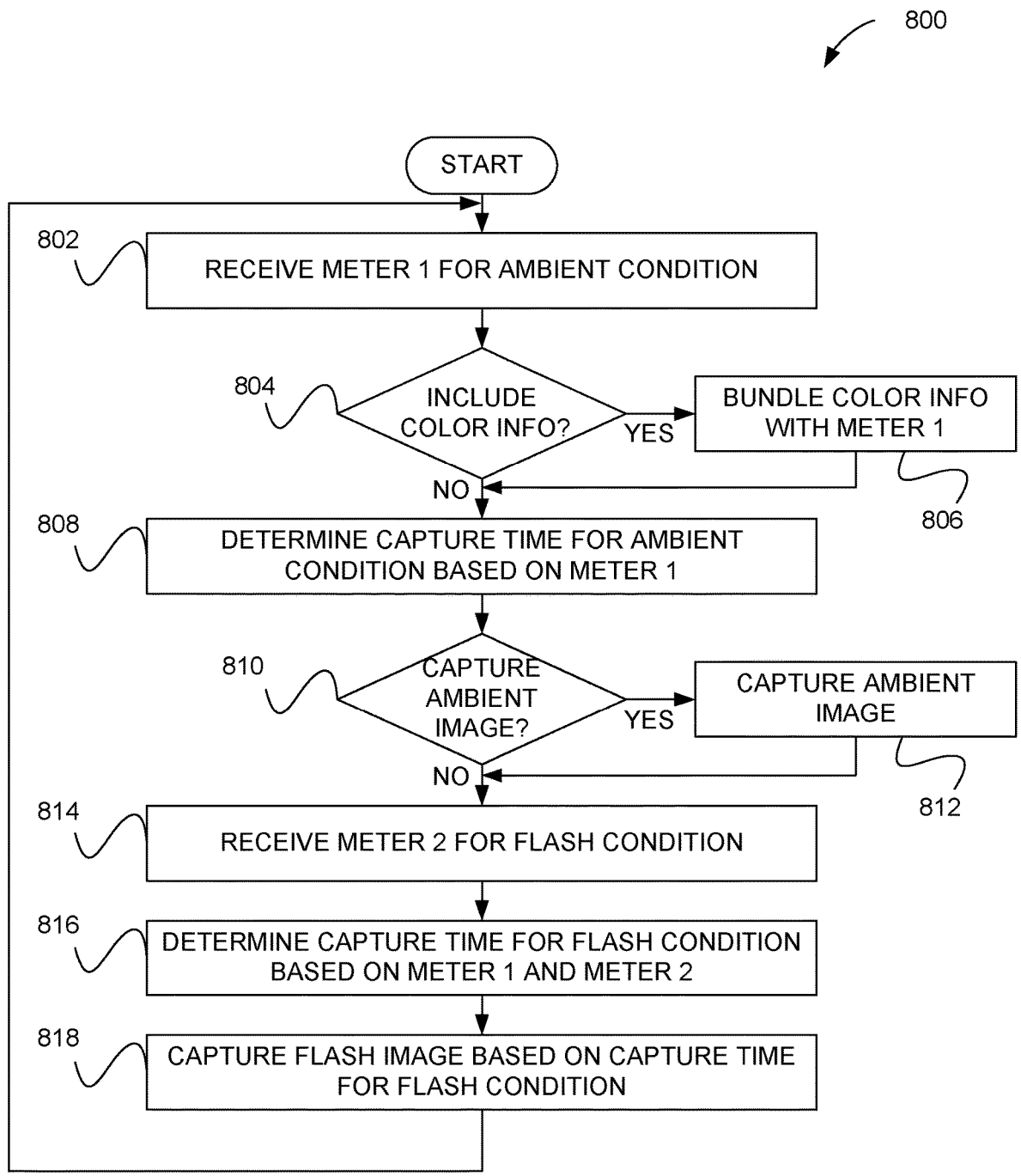
FIG. 8 illustrates a method for capturing a flash image based on a first and second metering, in accordance with one embodiment.

FIG. 8 illustrates a method 800 for capturing a flash image based on a first and second metering, in accordance with one embodiment. As an option, the method 800 may be implemented in the context of any one or more of the embodiments set forth in any previous and/or subsequent figure(s) and/or description thereof. For example, method 800 may be applied in the context of operation 110 of FIG. 1, and operation 210 of FIG. 2. Of course, however, the method 800 may be implemented in the context of any desired environment. Further, the aforementioned definitions may equally apply to the description below.

As shown, meter 1 is received for an ambient condition. See operation 802. In one embodiment, more than one metering may be received relating to a given ambient condition (or conditions). Next, it is determined to include color information. See decision 804. If yes, color information is bundled with meter 1. See operation 806. In one embodiment, color information may be bundled with meter 1 as metadata.

Next, a capture time is determined for the ambient condition based on meter 1. See operation 808. For example, if meter 1 indicates that the ambient condition is a low-light situation, then the capture time would include a longer exposure due to less light being present in a scene being photographed. Additionally, in another embodiment, if multiple points of focus were present in the image, then more than one metering may be required, and each may require a separate capture time for a given ambient condition.

It is then determined whether to capture the ambient image. See decision 810. If so, then the ambient image is captured. See operation 812.

Next, meter 2 is received for flash condition. See operation 814. In one embodiment, more than one metering may be received relating to a flash condition (or conditions). For example, in one embodiment, a scene may be metered for a flash capture to determine best exposure for the entire scene, but a second flash metering may be used to determine a best exposure for a point of interest (e.g. a face, an object, etc.).

A capture time is then determined for flash condition based on meter 1 and meter 2. See operation 816. For example, information from meter 1 (e.g. overall scene exposure at a first flash intensity, etc.) and information from meter 2 (e.g. optimal flash amount for point of interest, etc.) may be used to determine total capture time for a flash condition.

In one embodiment, the flash condition may include more than an indication of duration of flash. For example, a ramp up of flash intensity (e.g. time graph 700), or other flash intensity function may be included in the flash condition.

Last, a flash image is captured based on the capture time for flash condition. See operation 818. As discussed above, flash condition may include elements from both meter 1 and/or meter 2.

Figure 9:
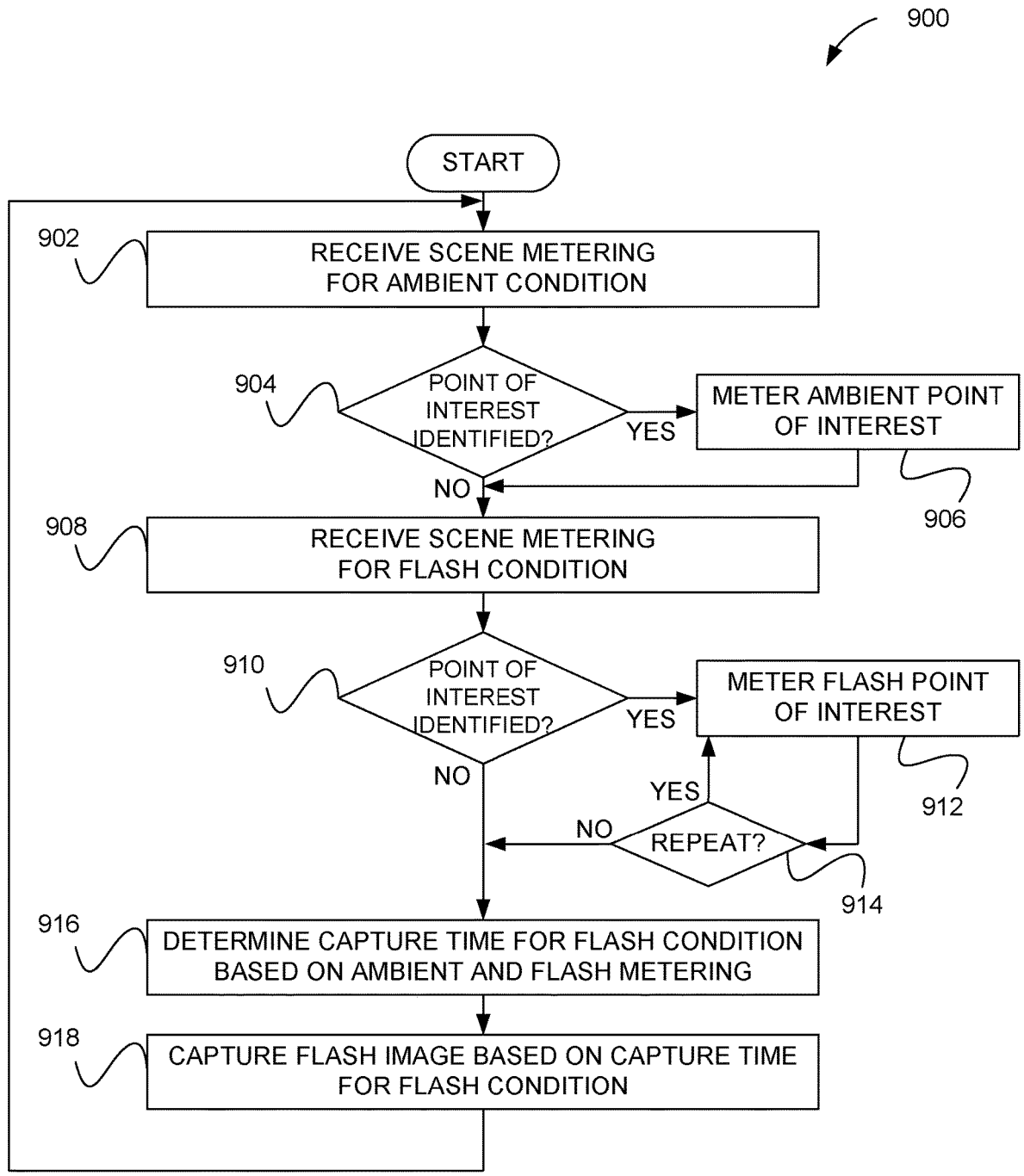
FIG. 9 illustrates a method for setting a point of interest associated with a flash exposure, in accordance with one embodiment.

FIG. 9 illustrates a method 900 for setting a point of interest associated with a flash exposure, in accordance with one embodiment. As an option, the method 900 may be implemented in the context of any one or more of the embodiments set forth in any previous and/or subsequent figure(s) and/or description thereof. For example, method 900 may be applied in the context of operation 110 of FIG. 1, and operation 210 of FIG. 2. Of course, however, the method 900 may be implemented in the context of any desired environment. Further, the aforementioned definitions may equally apply to the description below.

As shown, scene metering is received for an ambient condition. See operation 902. In one embodiment, scene metering may include a global metering, an optimal exposure (e.g. histogram median for captured image at dynamic range intensity mid-point, etc.), a recommended aperture and/or shutter speed, one or more objects, etc. Next, it is determined if a point of interest is identified. See decision 904. In various embodiments, a point of interest may be identified manually (e.g. via an input, via a user, etc.), or automatically (e.g. object recognition, contextual awareness, etc.). In one embodiment, a point of interest may be determined only if a user indicates in advance to identify points of interest in scenes. Further, such identification of points of interest may rely, at least in part, on data obtained through an external source (e.g. internet, cloud, another connected device, etc.).

If a point of interest is identified, then an ambient point of interest is metered. See operation 906. For example, if under ambient conditions a face (or multiple faces) is identified, then the face may be used as the basis for metering for the point of interest. Additionally, if multiple points of interest are identified, in one embodiment, multiple meterings may each occur, at least one per point of interest.

Additionally, in another embodiment, based on the scene and point of interest meterings for ambient condition, one or more capture times for ambient condition may be determined. Further, a capture (or multiple captures) associated with the scene and point of interest meterings may also occur.

Next, scene metering for flash condition is received. See operation 908. In one embodiment, scene metering may seek to optimize exposure parameters to reduce overexposed pixels. In another embodiment, scene metering may seek to reduce overexposed pixels while maximizing correct exposure for the entire scene. Next, it is determined if a point of interest for a flash condition is identified. See decision 910.

In one embodiment, the point of interest identified via decision 904 may correlate with the same point of interest identified via decision 910. In another embodiment, however, a point of interest for a flash condition may differ from a point of interest for an ambient condition. For example, a point of interest for an ambient condition may be the sky, while a point of interest for a flash condition may be an individual's face.

A flash point of interest is then metered. See operation 912. In one embodiment, multiple points of interest may be identified. Therefore, per decision 914, it is determined whether additional meterings need to occur (i.e. repeat metering step). In another embodiment, one metering may satisfy more than one point of interest. For example, two faces in close proximity to each other may each have the same metering.

Additionally, although not shown in method 900, after identifying and metering a point of interest, it may also be determined whether the point of interest has moved. In one embodiment, such movement may be analyzed with respect to a threshold, where if the movement is below a set threshold, no action is taken, whereas if the movement is above a set threshold, then another metering may need to occur.

Next, a capture time for flash condition based on the ambient metering and flash metering is determined. See operation 916. In one embodiment, the ambient metering may include both ambient scene metering and ambient point(s) of interest metering. Additionally, the flash metering may include both flash scene metering and flash point(s) of interest metering.

Last, a flash image based on the capture time for flash condition is captured. See operation 918.

Figure 10:
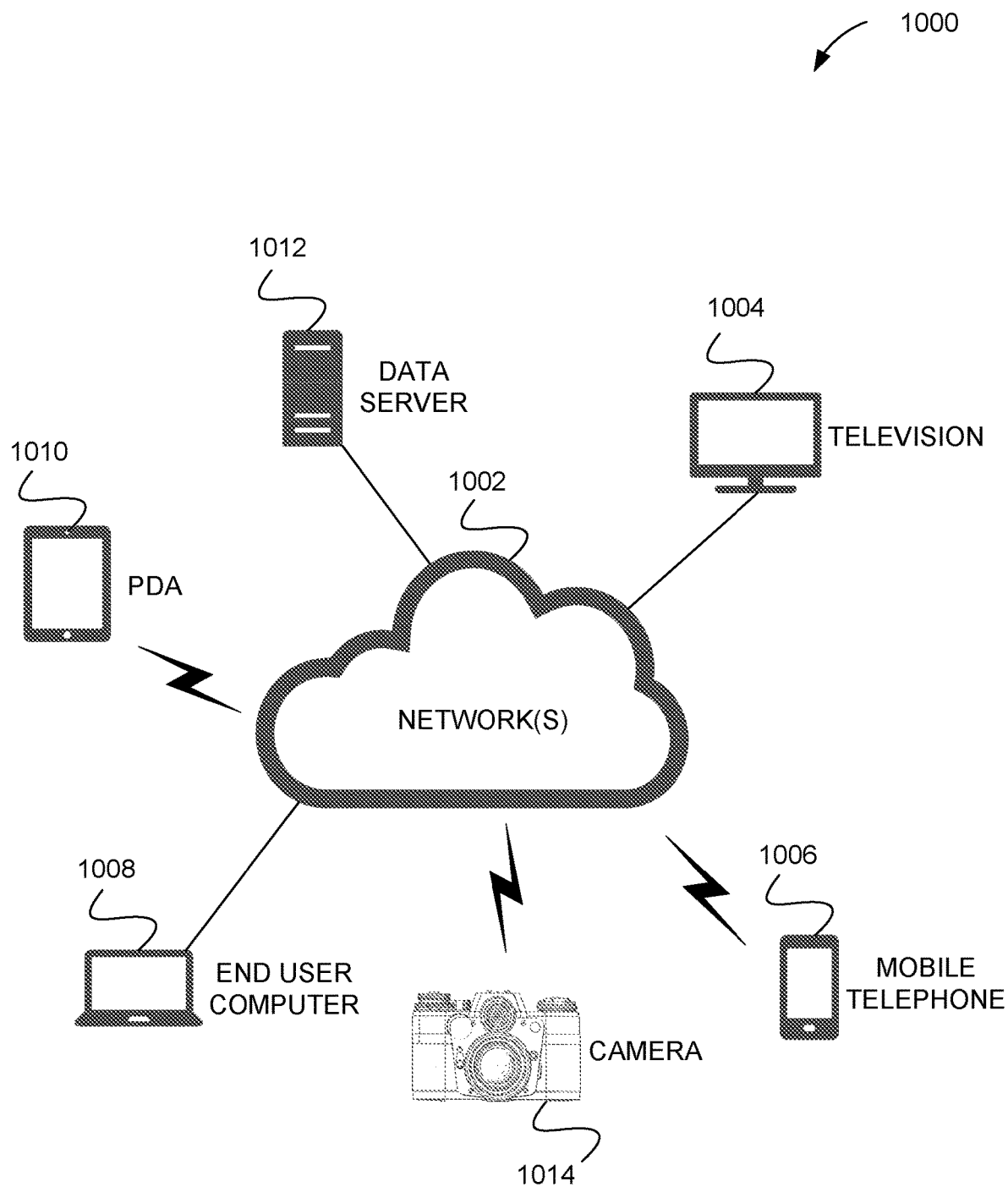
FIG. 10 illustrates a network architecture, in accordance with one possible embodiment.

FIG. 10 illustrates a network architecture 1000, in accordance with one possible embodiment. As shown, at least one network 1002 is provided. In the context of the present network architecture 1000, the network 1002 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1002 may be provided.

Coupled to the network 1002 is a plurality of devices. For example, a server computer 1012 and an end user computer 1008 may be coupled to the network 1002 for communication purposes. Such end user computer 1008 may include a desktop computer, lap-top computer, and/or any other type of logic. Still yet, various other devices may be coupled to the network 1002 including a personal digital assistant (PDA) device 1010, a mobile phone device 1006, a television 1004, a camera 1014, etc.

Figure 11:
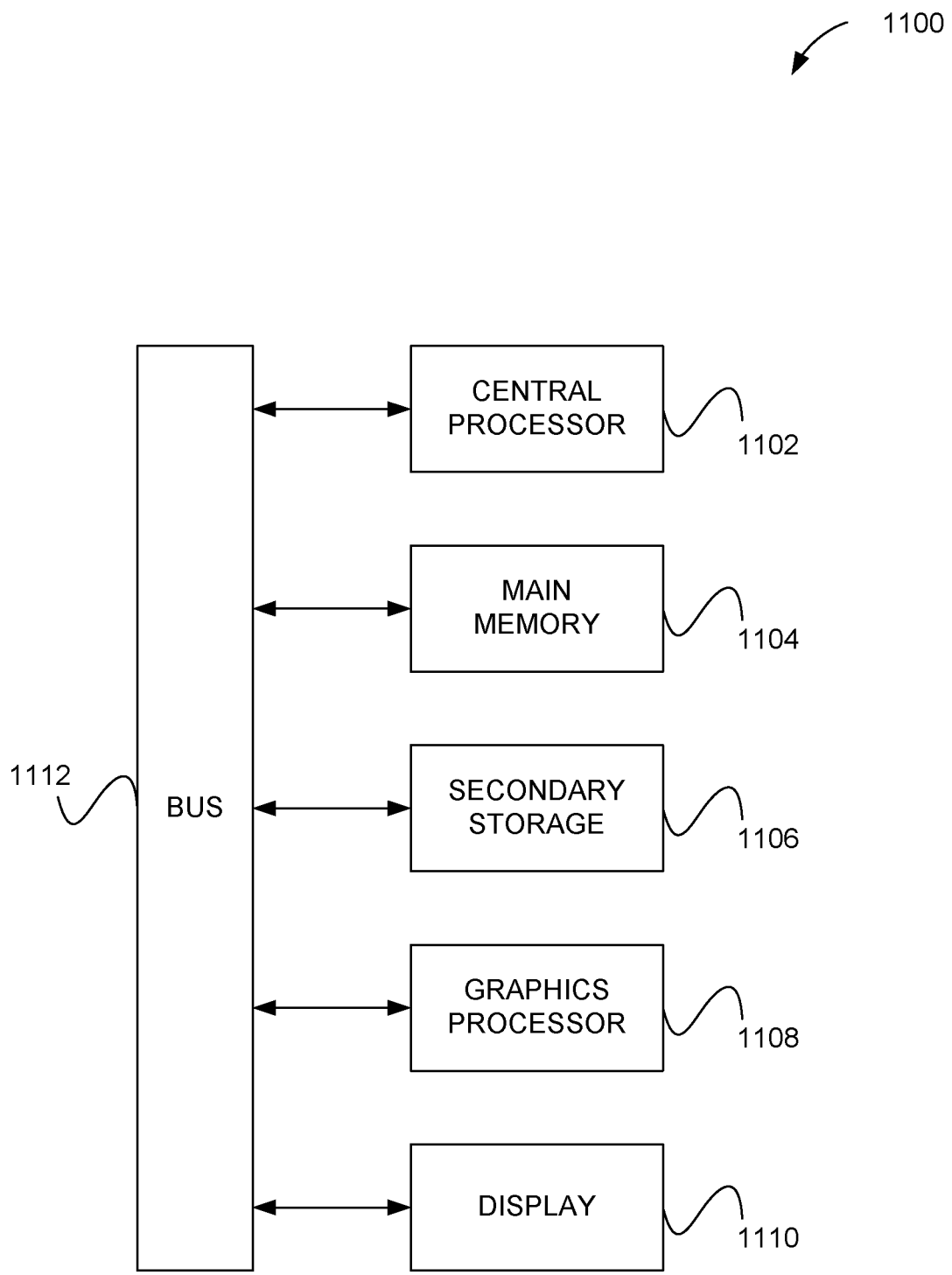
FIG. 11 illustrates an exemplary system, in accordance with one embodiment.

FIG. 11 illustrates an exemplary system 1100, in accordance with one embodiment. As an option, the system 1100 may be implemented in the context of any of the devices of the network architecture 1000 of FIG. 10. Of course, the system 1100 may be implemented in any desired environment.

As shown, a system 1100 is provided including at least one central processor 1102 which is connected to a communication bus 1112. The system 1100 also includes main memory 1104 [e.g. random access memory (RAM), etc.]. The system 1100 also includes a graphics processor 1108 and a display 1110.

The system 1100 may also include a secondary storage 1106. The secondary storage 1106 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 1104, the secondary storage 1106, and/or any other memory, for that matter. Such computer programs, when executed, enable the system 1100 to perform various functions (as set forth above, for example). Memory 1104, storage 1106 and/or any other storage are possible examples of non-transitory computer-readable media.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. An apparatus, comprising:
  a non-transitory memory storing instructions; and
  one or more processors in communication with the non-transitory memory, wherein the one or more processors execute the instructions to:
    meter a first ambient condition, using a camera module, for a first ambient frame;
    determine a first ambient capture time based on the metering of the first ambient condition;
    based on the first ambient capture time, determine that a need exists for pre-metering of a first flash condition;
    meter the first flash condition, using the camera module, for a first flash frame, wherein metering the first flash condition includes a repetitive pre-metering operation where each sample of the repetitive pre-metering operation occurs at a different flash intensity level;
    determine a first flash capture time based on the metering of the first flash condition;
    capture, using a rolling shutter image sensor within the camera module, the first ambient frame based on the first ambient capture time;
    after capturing the first ambient frame, enable a flash circuit during an active period;
    capture, using the rolling shutter image sensor, the first flash frame based on a combination of the first ambient capture time and the first flash capture time;
    perform a line reset after the combination of the first ambient capture time and the first flash capture time; and
    generate a final image based on the first ambient frame and the first flash frame.

2. The apparatus of claim 1, wherein metering the first ambient condition includes identifying a white balance.

3. The apparatus of claim 1, wherein metering the first flash condition includes capturing multiple metering images.

4. The apparatus of claim 1, wherein metering the first ambient condition results in a first set of exposure parameters and metering the first flash condition results in a second set of exposure parameters.

5. The apparatus of claim 1, wherein an exposure time of the first flash condition is less than an exposure time of the first ambient condition.

6. The apparatus of claim 1, wherein metering the first flash condition includes determining one or more of: a flash duration, a flash intensity, and a flash color.

7. The apparatus of claim 1, comprising further instructions to:
  capture a second image based on the first ambient capture time;
  capture a third image based on the first flash capture time;
  blend the second image and the third image to create a fourth image.

8. The apparatus of claim 1, wherein metering the first flash condition includes determining exposure parameters that satisfy an exposure goal.

9. The apparatus of claim 8, wherein the exposure goal ensures that not more than five percent of over-exposed pixels are contained within the final image.

10. The apparatus of claim 8, wherein the exposure goal provides a limit on a number of over-exposed pixels within the final image.

11. The apparatus of claim 8, wherein the exposure goal includes a set intensity goal including a range of goal values or a fixed goal value.

12. The apparatus of claim 8, wherein the exposure goal bounds over-exposed pixels associated with the metering of the first flash condition to over-exposed pixels associated with the metering of the first ambient condition.

13. The apparatus of claim 8, wherein the exposure goal is associated with a point of interest.

14. The apparatus of claim 1, wherein the first flash condition is used to determine a flash intensity.

15. The apparatus of claim 14, wherein the flash intensity is used to control over-exposed pixels or is used to satisfy an exposure goal.

16. The apparatus of claim 14, wherein the flash intensity is based on the metering of the first ambient condition and a distance to a flash point of interest.

17. The apparatus of claim 1, wherein the active period ends before a scan out of the first flash frame.

18. An apparatus, comprising:
a non-transitory memory storing instructions; and
one or more processors in communication with the non-transitory memory, wherein the one or more processors execute the instructions to:
  meter a first ambient condition, using a camera module, for a first ambient frame;
  determine a first ambient capture time based on the metering of the first ambient condition;
  based on the first ambient capture time, determine that a need exists for pre-metering of a first flash condition;
  meter the first flash condition, using the camera module, for a first flash frame, wherein metering the first flash condition includes a repetitive pre-metering operation where each sample of the repetitive pre-metering operation occurs at a different flash intensity level;
  determine a first flash capture time based on the metering of the first flash condition;
  capture, using a rolling shutter image sensor within the camera module, the first ambient frame based on the first ambient capture time;
  after capturing the first ambient frame, enable a flash circuit during an active period;
  capture, using the rolling shutter image sensor, the first flash frame based on a combination of the first ambient capture time and the first flash capture time;
  perform a line reset after the combination of the first ambient capture time and the first flash capture time; and
  generate a final image based on the first ambient frame and the first flash frame.

19. A method, comprising:
metering a first ambient condition, using a camera module, for a first ambient frame;
determining a first ambient capture time based on the metering of the first ambient condition;
based on the first ambient capture time, determine that a need exists for pre-metering of a first flash condition;
metering the first flash condition, using the camera module, for a first flash frame, wherein metering the first flash condition includes a repetitive pre-metering operation where each sample of the repetitive pre-metering operation occurs at a different flash intensity level;
determining a first flash capture time based on the metering of the first flash condition;
capturing, using a rolling shutter image sensor within the camera module, the first ambient frame based on the first ambient capture time;
after capturing the first ambient frame, enabling a flash circuit during an active period;
capturing, using the rolling shutter image sensor, the first flash frame based on a combination of the first ambient capture time and the first flash capture time;
performing a line reset after the combination of the first ambient capture time and the first flash capture time; and
generating a final image based on the first ambient frame and the first flash frame.

* * * * *